United States Patent [19]

Hayashi et al.

[11] Patent Number: 5,081,528
[45] Date of Patent: Jan. 14, 1992

[54] IMAGE FORMING APPARATUS

[75] Inventors: Kimiyoshi Hayashi, Souka; Hitoshi Arai, Tsuchiura; Kazuhiko Hirooka, Tokyo; Toshio Honma, Kawasaki; Kenichi Takeda, Yokohama, all of Japan

[73] Assignee: Canon Kabushiki Kaisha, Tokyo, Japan

[21] Appl. No.: 674,305

[22] Filed: Mar. 25, 1991

Related U.S. Application Data

[63] Continuation of Ser. No. 320,088, Mar. 7, 1989, abandoned.

[30] Foreign Application Priority Data

| Mar. 10, 1988 | [JP] | Japan | 63-054811 |
| Mar. 10, 1988 | [JP] | Japan | 63-054814 |
| Mar. 10, 1988 | [JP] | Japan | 63-054816 |
| Mar. 10, 1988 | [JP] | Japan | 63-054817 |
| Mar. 10, 1988 | [JP] | Japan | 63-054819 |
| Mar. 10, 1988 | [JP] | Japan | 63-054820 |
| Mar. 10, 1988 | [JP] | Japan | 63-054821 |

[51] Int. Cl.$^5$ .......................... H06N 1/46; G03P 3/08
[52] U.S. Cl. ...................... 358/75; 358/456; 358/459; 358/298
[58] Field of Search ............ 358/75, 80, 456, 455, 358/457, 454, 459, 466, 296, 298

[56] References Cited

U.S. PATENT DOCUMENTS

| 3,911,480 | 10/1975 | Brucker | 358/75 |
| 3,961,132 | 6/1976 | Landsman | 178/6.7 R |
| 4,004,079 | 1/1977 | Boston | 358/256 |
| 4,633,327 | 12/1986 | Roetling | 358/283 |
| 4,635,131 | 1/1987 | Terada et al. | 358/298 |
| 4,651,287 | 3/1987 | Tsao | 358/75 |
| 4,680,625 | 7/1987 | Shoji et al. | 358/75 |
| 4,692,796 | 9/1987 | Yamada et al. | 358/76 |
| 4,707,745 | 11/1987 | Sakano | 358/466 |
| 4,717,954 | 1/1988 | Fujita et al. | 358/80 |
| 4,752,822 | 6/1988 | Kawamura | 358/457 |
| 4,814,891 | 3/1989 | Uchiyama et al. | 358/80 |
| 4,864,419 | 9/1989 | Saito et al. | 358/296 |
| 4,893,177 | 1/1990 | Tada et al. | 358/80 |
| 4,969,052 | 11/1990 | Ushida et al. | 358/457 |

FOREIGN PATENT DOCUMENTS

| 213891 | 3/1987 | European Pat. Off. |
| 225100 | 6/1987 | European Pat. Off. |
| 2535477 | 5/1984 | France |
| 2102240 | 1/1983 | United Kingdom |
| 2132847 | 7/1984 | United Kingdom |

OTHER PUBLICATIONS

"A Survey of ELectronic Techniques for Pictorial Image Reproduction", in IEEE Transactions on Communications, vol. COM-29, No. 12 (Dec. 1981), pp. 1898-1925, Stoffel et al.

(List continued on next page.)

Primary Examiner—John K. Peng
Attorney, Agent, or Firm—Fitzpatrick, Cella, Harper & Scinto

[57] ABSTRACT

In an image forming apparatus for forming an ordinary copy or a tonality image for an original image for a printing press, original image data is divided into data within a predetermined area and that outside the area, and pixel density within the area is subjected to a density conversion in accordance with screen half-toning information which will increase density information toward the approximate center of these pixels, by way of example. The original image data or the density-converted image data is converted into a binary-coded signal conforming to the density, and an output image is formed in accordance therewith. Preferably, plural types of non-linear correction tables are provided and a tone-conversion is performed selecting an appropriate correction table for each pixel, or for each line, of the density-converted image data. Preferably, the original image data is binary coded by a pattern signal having a long period, and the density-converted image data is binary coded by a pattern signal having a short period. The foregoing is applied to color-separated image data of each color. Preferably, the image data is divided, in accordance with color, into predetermined areas having the same or a different number of pixels, or into predetermined areas having a planar phase which differs for each color, and a screen angle is applied thereto.

28 Claims, 19 Drawing Sheets

OTHER PUBLICATIONS

"Color Thermal Ink-Transfer Imaging", in IEEE Transactions on Electron Devices, vol. ED-31, No. 9 (Sep. 1984), pp. 1258-1263, Ohya et al.

"Dithering Methods of Color Images Directly Applicable to Run-Length Coding", in IEEE/IEICE Global Telecommunications Conference, Nov. 15-18, 1987, vol. 1, pp. 1171-1175, Sakamoto.

Cyan (θ = 56.3°)

Magenta (θ = 33.7°)

Black (θ = 71.6°)

Yellow (θ = 18.4°)

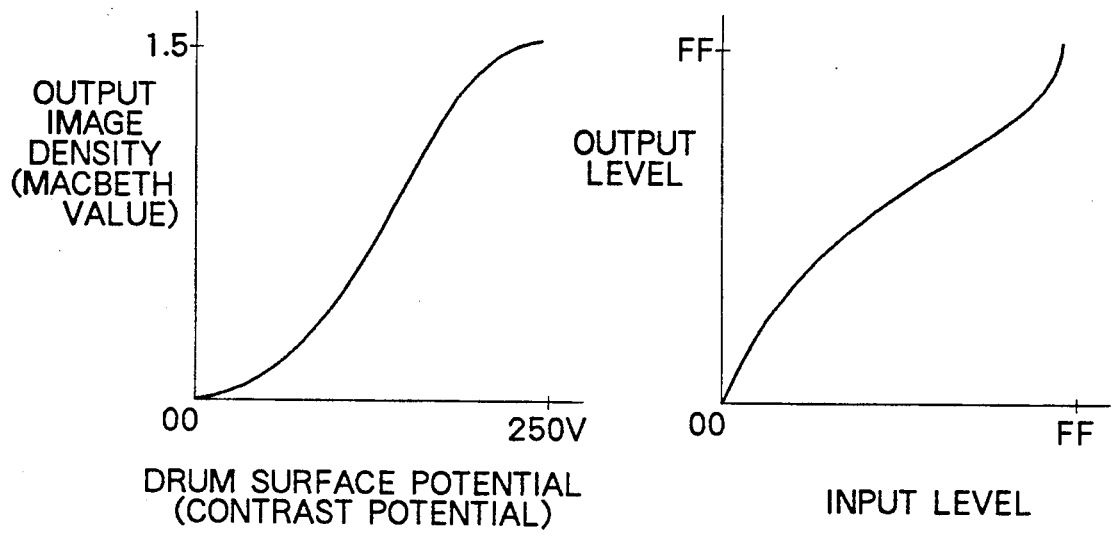
FIG. 8 (A)
FIG. 8 (B)
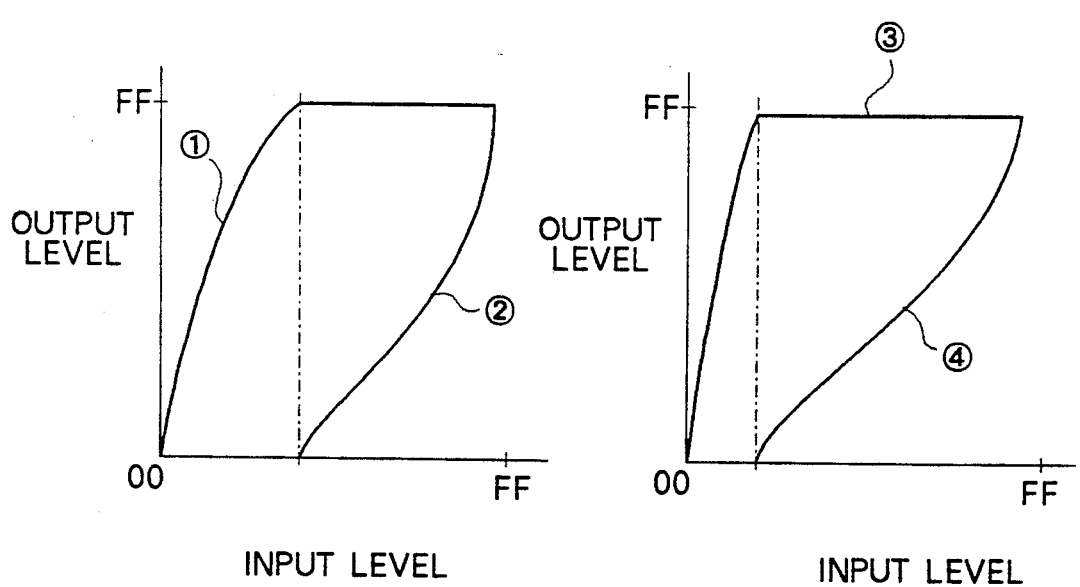
FIG. 8 (C)
FIG. 8 (D)

IMAGE FORMING APPARATUS

This application is a continuation of application Ser. No. 07/320,088, filed Mar. 7, 1989, now abandoned.

BACKGROUND OF THE INVENTION

This invention relates to an image forming apparatus for processing image data and forming a tone image.

With an apparatus of this kind, a screen half-toned (converted into half-tone dot) image is formed by a dither method, light-emission time control method, brightness modulation control method, etc. With methods such as the dither method, however, the tonality and resolution of the image decline and there is no improvement in image quality. With the light-emission time control method and brightness modulation method, screen half-toning is insufficient and impediments are encountered at print-out.

When an original image for printing presses is formed or an ordinary copy is made using the conventional apparatus of the above-described type, dot formation is carried out without changing the method of image representation (i.e., the method of image reproduction). When the original image printing presses is produced, therefore, printing dot size is not constant and the original image cannot be used as such an original image for printing presses.

Further, in the conventional apparatus of the foregoing type, an enhancement in image quality is attempted by applying so-called screen angle control in a printing technique. With the dither method, however, tonality and resolution decline. Though tonality and resolution are improved with a dot modulation method or the brightness modulation method, performing image processing for each and every dot is fundamental and, in consequence, the screen angle is greatly limited by the main scanning and subsidiary scanning methods and a screen angle cannot be applied at will.

With the conventional apparatus of the foregoing type, an irregularity shading occurs when there is a deviation in speed combination between a photosensitive body drive mechanism and a laser irradiation mechanism, by way of example. When an image is outputted, therefore, the screen half-tones and irregular shade interfere and the image deteriorates.

With the abovementioned apparatus, tonal representation of an image is performed by the dither method, light-emission time control method, brightness modulation method, etc. However, tone jump occurs with these methods owing to an electrophotographic characteristic at the time of image formation. In addition, color tone changes unless the origin of the screen half-tones are aligned when the screen half-tones are formed.

With the abovementioned apparatus, color print images for toners of the three colors yellow (Y), magenta (M) and cyan (C) along with the color black (Bk) for inking are color-synthesized in the sequence C→M→Y→Bk or M→C→Y→Bk. However, when colors are synthesized in these sequences, the Y toner, which has high reflectance and relative luminous efficiency, rises to the top layer (see FIG. 15). As a result, the image tends to have a strong yellowish color and color reproducibiilty declines.

In order to obtain a reproduced image having a high quality, the applicant has already proposed the cases indicated below, however, further improvements are sought: U.S. Pat. Nos. 4,763,199, 4,800,442, 4,811,037, 4,819,006, 4,847,654, 4,847,695, 4,870,499, 4,873,537, 4,897,734, 4,980,757 and 4,987,495, and U.S. patent applications Ser. Nos. 07/378,488 (July 12, 1989) and 07/090,238 (Aug. 25, 1987).

SUMMARY OF THE INVENTION

The present invention has been devised in order to eliminate the foregoing drawbacks of the prior art.

An object of the present invention is to provide an image forming apparatus for forming screen half-toned (half-tone dot) images having improved tonality and resolution.

Another object of the present invention is to provide an image forming apparatus capable of forming both an ordinary color copy and a high-quality original image for printing presses through a simple construction.

Still another object of the present invention is to provide an image forming apparatus in which screen angle control can be performed at will.

A further object of the present invention is to provide an image forming apparatus for forming screen half-toned images without irregular shades and moire.

A further object of the present invention is to provide an image forming apparatus capable of outputting a high-quality image.

A further object of the present invention is to provide an image forming apparatus with which a stable output image can be obtained.

A further object of the present invention is to provide an image forming apparatus having excellent color reproducibility.

According to the present invention, there is provided an image forming apparatus which comprises density converting means for dividing image data into data within a predetermined area and data outside the area, and subjecting pixel density within the area to a density conversion in accordance with predetermined screen half-toning information, binary coding means for converting the image data, which has been density-converted by the density converting means, into a binary-coded signal conforming to the density, and image forming means for forming an output image in accordance with the binary-coded signal outputted by the binary coding means.

Further, according to the present invention, there is provided an image forming apparatus which comprises operating means for designating an image output mode, density converting means for subjecting color-separated image data of each color to a density conversion in accordance with predetermined screen half-toning information, pulse-width modulated signal output means for tone-processing the color-separated image data of each color or the image data density-converted by the density converting means, and outputting a pulse-width modulated signal, and image forming means for selectively setting, in dependence upon a designation from the operating means, a mode in which one reproduced image is formed on the same recording medium by the pulse-width modulated signal based on the color-separated image data of each color, and a mode in which a reproduced image corresponding to each color is formed on recording media the number whereof corresponds to the number of color separations, by the pulse-width modulated signal based on the image data density-converted by the density converting means.

Further, according to the present invention, there is provided an image forming apparatus which comprises pulse-width modulated signal output means for tone-processing color-separated image data of each color and outputting pulse-width modulated signals corresponding to respective ones of the colors, and image forming means for forming, on different recording media, images the number whereof corresponds to the number of color separations in accordance with the pulse-width modulated signals which correspond to respective ones of the colors and which are outputted by the pulse-width modulated signal output means.

Further, according to the present invention, there is provided an image forming apparatus which comprises density converting means for subjecting color-separated image data of each color to a density conversion in accordance with predetermined screen half-toning information, binary coding means for converting the image data, which has been density-converted by the density converting means, into a binary-coded signal conforming to the density, and image forming means for forming images the number whereof corresponds to the number of color separations in accordance with the binary-coded signal outputted by the binary coding means.

Further, according to the present invention, there is provided an image forming apparatus which comprises density converting means for subjecting image data to a density conversion in accordance with predetermined screen half-toning information, tone converting means for performing a density tone conversion on the image data density-converted by the density converting means, binary coding means for converting the image data, which has been tone-converted by the tone converting means, into a binary-coded signal conforming to the density thereof, and image forming means for forming an output image in accordance with the binary-coded signal.

Further, according to the present invention, there is provided an image forming apparatus which comprises tone processing means for tone processing color-separated image data of each color, developing means for developing the image of each color in accordance with the image data tone-processed by the tone processing means, and transfer means for transferring the developed images to the same transfer material in order starting from a yellow image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8(A)–(D) are views for describing the conversion characteristic of a LUT (2) according to the embodiment;

DESCRIPTION OF THE PREFERRED EMBODIMENT

An embodiment of the present invention will now be described in detail with reference to the accompanying drawings.

<Description of the Mechanism>

Figure 11:
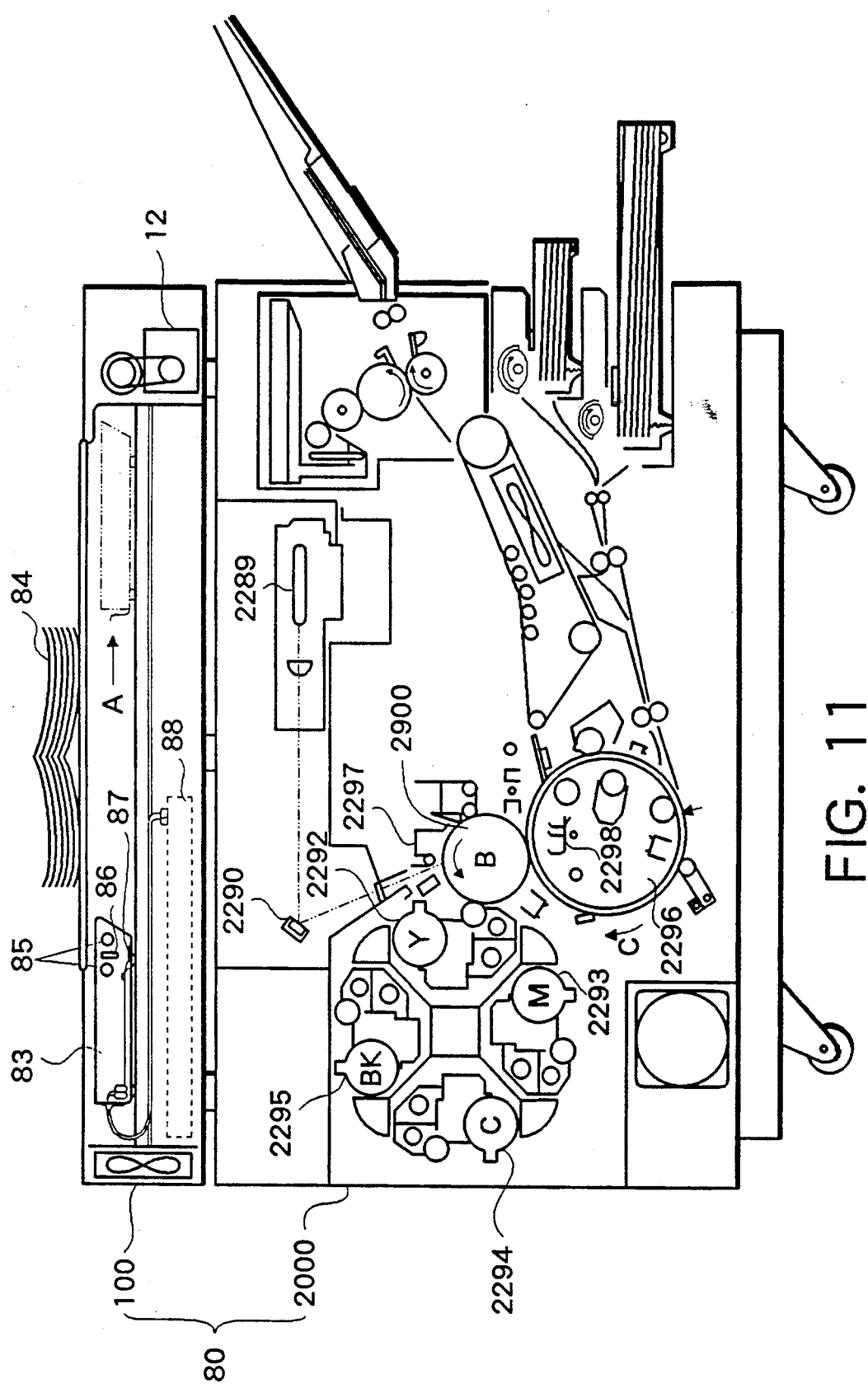
FIG. 11 is a sectional view illustrating the mechanism of a digital color reader/printer of the embodiment.

FIG. 11 is a sectional view illustrating the mechanism of a digital color reader/printer embodying the present invention. The reader/printer, shown at numeral 80, comprises a reading section 100 for reading a color original image upon separating the image thereof into colors, and a printing section 2000 for forming the image of a color reproduction (a copy image) or an original image for a printing press (a color-separated image) separated into each color print image.

The reading section 100 includes a scanning unit 83 which causes a lit exposure lamp 85 to scan an original 84, which has been placed on a platen, in the subsidiary direction, namely the direction of arrow A, in order to read the original 84. Light reflected from the original 84 is introduced into a focusing rod lens array 86 to be focused onto a contact-type color CCD sensor 87. For example, this CCD sensor chip has a resolution of 16 pel (62.5 $\mu$m) and comprises 1024 pixels. The sensor chip is composed of a total of five chips interdigitated in the main scanning direction. The pixels of the sensor chip are divided into three areas of 15.5 $\mu$m $\times$ 62.5 $\mu$m, and color filters for cyan (C), green (G) and yellow (Y) are affixed to respective ones of the areas. Thus, the optical image focused on the CCD sensor 87 is converted into C, G and Y electrical signals, which are delivered to a signal processing block 88. The latter converts these C, G and Y electrical signals into yellow (Y), magenta (M), cyan (C) and black (BK) digital video data, which is delivered to the printing section 2000 color by color.

In the printing section 2000 the inputted video data is subjected to a density conversion (pulse-width modulation) either directly or upon being subjected to screen half-toning processing and, in certain cases, has a portion thereof combined with a font pattern. The resulting pulse-width modulated bi-level reproduction signal drives a laser beam in on/off fashion. The laser beam is converted into a high-speed horizontal (main) scanning beam by a polygon mirror 2289 rotating at high speed. This main scanning beam is reflected further by a mirror 2290 to carry out dot exposure, which corresponds to the video data, on the surface of a photosensitive drum 2900. One main scanning length of the laser beam corresponds to one main scanning length of the video data. In other words, the beam dots have a resolution of 16 pel in the illustrated embodiment.

The photosensitive drum 2900 rotates in the direction of arrow B at a constant speed. The photosensitive drum 2900 is uniformly charged in advance by a charging device 2297. An electrostatic latent image of each color-separated color print image is formed by beam-dot exposing the video data o the surface of the uniformly charged photosensitive drum 2900. For example, electrostatic latent images are formed in the order of the color print images Y, M, C, BK per revolution of the drum. The electrostatic latent images of the color print images are developed by respectively corresponding developers 2292–2295 and transferred to a transfer material (paper, etc.) wound on a transfer drum 2296.

As for a single cycle of scanning of an original performed by the reading section 100, first the Y-component dot image is exposed on the photosensitive drum, this image is developed by the Y developer, and the image is transferred to the transfer material. Next, the M-component dot image is exposed on the photosensitive drum, this image is developed by the M developer, and the image is transferred to the transfer material. Thereafter, and in similar fashion, exposure, development and transfer are performed for the C and BK components.

The supply and operation of the transfer material are controlled at this time, though the arrangement is not shown in the drawings. Specifically, and by way of example, the data of each color print image is superimposed on the same transfer paper to perform color synthesis so that an ordinary color copy is obtained. In obtaining the color copy, the transfer is made from the Y component first for the reason described below.

Figure 16:
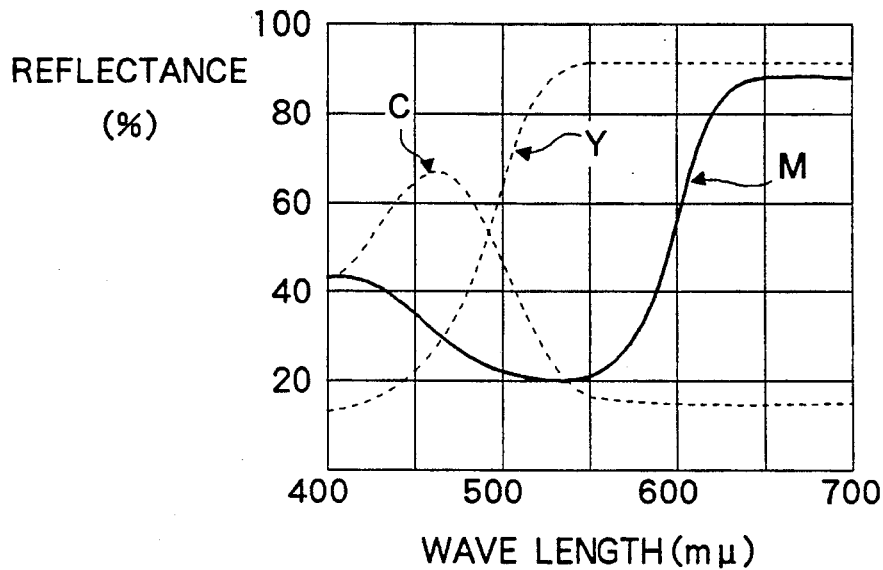
FIG. 16 is a view illustrating the relationship between wavelength and reflectance.
Figure 17:
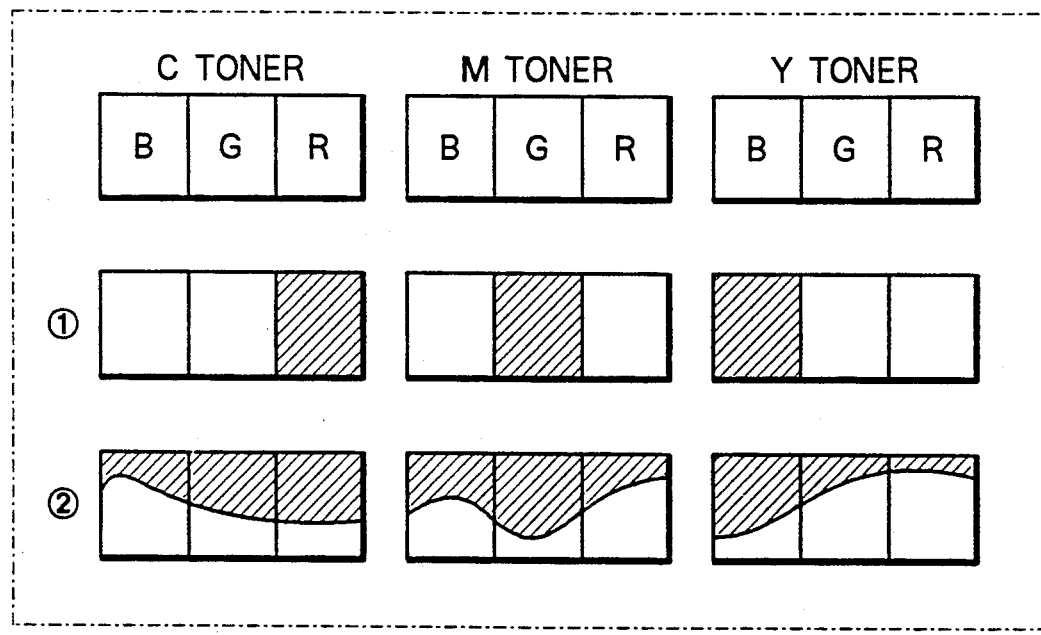
FIG. 17 is a view illustrating the states of reflection and absorption of an ideal toner and an actual toner.

FIG. 17 is a view illustrating reflection and absorption of an ideal toner and actual toner. In FIG. 17, ① illustrates the state of an ideal toner, with the shaded portions indicating an absorptive state and the white portions a reflective state. Specifically, the C toner absorbs red light (R) only, the M toner green light (G) only, and the Y toner blue light (B) only; these toners reflect all other light. ② illustrates the state of the actual toner. Here the C toner absorbs a considerable amount of blue and green light besides red light, and the M toner absorbs a considerable amount of blue and some red light besides green light. The Y toner absorbs some green light and some red light besides blue light. Accordingly, only the yellow toner substantially approaches the ideal. FIG. 16 illustrates the relationship between wavelength and reflectance. If the Y toner were to be made the uppermost layer, then the toner colors of the underlying layers would have difficulty showing through owing to reflection of green and red light, and the reproducibility of each color would decline. For this reason, it is better to make the Y toner the lowermost layer.

If the Y toner is thus made the lowermost layer, then the reflection and absorption characteristics of the overlying M or C toner must be corrected. However, when each color layer is formed by toner particles as in electrophotograpy, this correction can only be performed by increasing the amount of toner particles, namely by increasing layer thickness. When this is done, however, there is a reduction in the amount of light which penetrates down to the C toner of the lowermost layer, with the result that color reproducibility suffers even in this case. In the present embodiment, therefore, screen angle control of each color print image is carried out in the manner described below.

Figure 14:
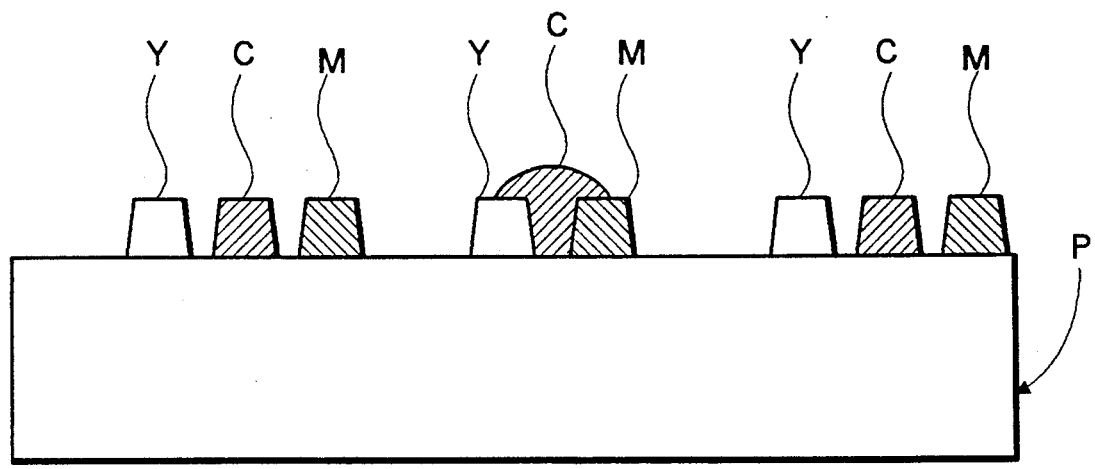
FIG. 14 is a sectional view of the pattern of an image formed on a transfer material according to the embodiment.
Figure 15:
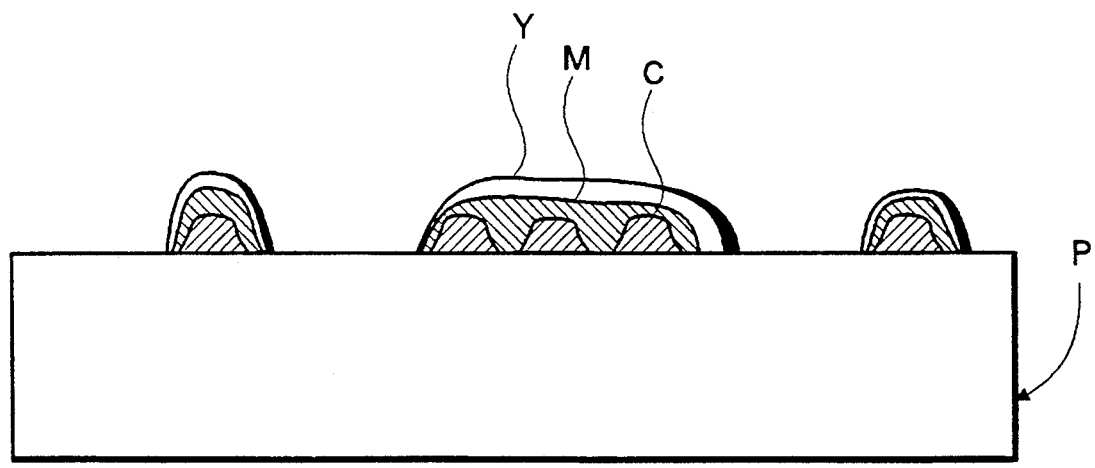
FIG. 15 is a sectional view illustrating the pattern of an image formed according to the prior art.

FIG. 14 is a sectional view of an image formation pattern formed on a transfer material P in accordance with the embodiment. By virtue of screen angle control, overlapping of the Y, M and C toners is almost nonexistent. Accordingly, no problems are encountered in terms of color reproducibility of the C toner of the lowermost layer. Even when this method is used, however, the screen half-tones become crowded together at the solid portions and overlapping of the screen half-tones cannot be avoided at the screen angle intersections. Consequently, placing the Y toner at the lowermost layer is meaningful and enhances overall color reproducibility.

Even if there is no overlapping of the screen half-tone latent images, there are instances where the screen half-tones on the transfer paper overlap owing to the effects of excess development, toner scattering at transfer and toner crushing at fixing. In order to prevent this, it is preferred that a developing material having an overall volume of more than 90% be distributed over the range $$\frac{M}{2} < \gamma < \frac{3M}{2}$$

where $\gamma$ represents the particle diameter of the developing material and M the volume mean particle diameter, and that a developer which is more than 99% overall be distributed over the range $$0 < \gamma 2M$$

The fact that the volume mean diameter of the above-mentioned developing material is less than 8 $\mu$m is desirable since this eliminates overlapping of the screen half-tones.

Next, it is possible to form an original image for color printing press by changing the transfer material for each color print image and making a transfer to transfer materials the number whereof corresponds to the number of color separations (Y, M, C, BK, etc.). The color in which development is to be made is controlled. Specifically, though it is acceptable to develop the data of the color print images in the corresponding colors Y, M, C and BK, it is also permissible to develop the data of each color print image in only one color (e.g. the color BK) from among the colors Y, M, C and BK. If this is done, a comparative evaluation of each original print image is easy and, moreover, color at the time of actual color printing can be decided by ink for printing. From this point of view, the printing mechanism of the embodiment is a color printing mechanism. However, this can be replaced by an ordinary printing mechanism which prints in a single color, namely the color black.

<Description of the Functional Blocks>

Figure 1:
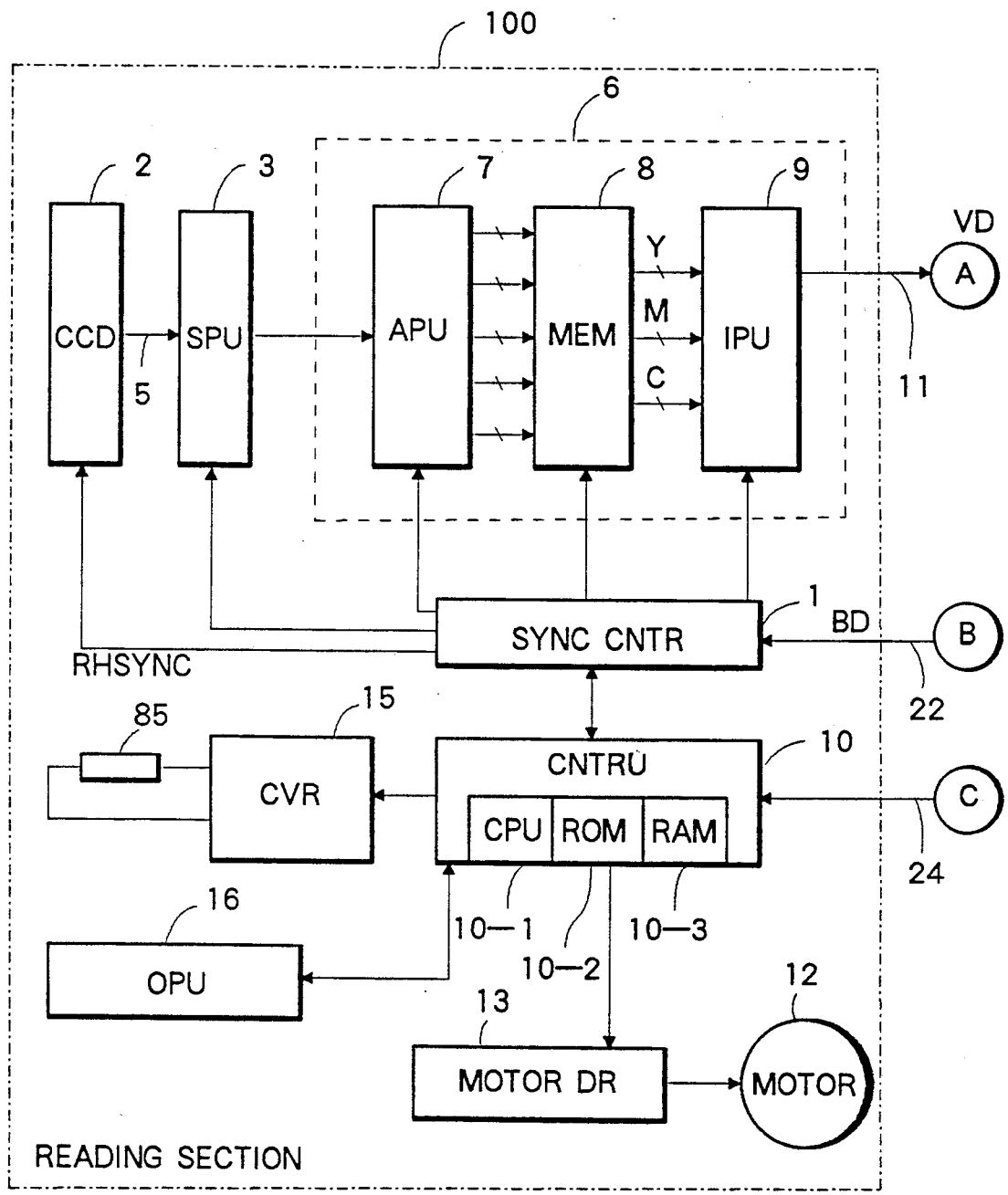
FIGS. 1(A) and (B) are functional block diagrams illustrating a digital color reader/printer embodying the present invention.
Figure 1:
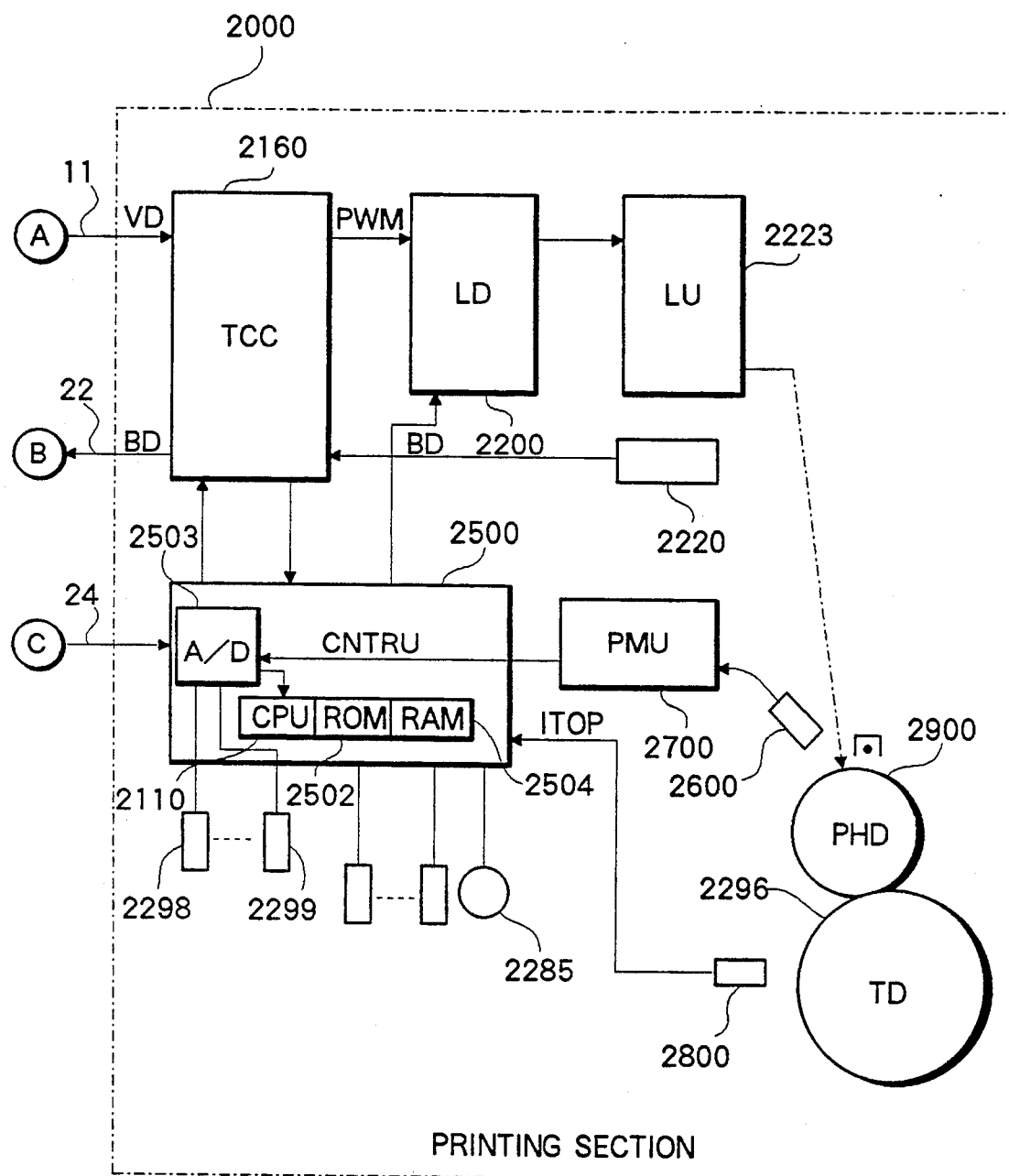

FIGS. 1(A) and (B) are functional block diagrams of the digital color reader/printer embodying the invention. FIG. 1(A) is a functional block diagram of the reading section 100, and FIG. 1(B) is a functional block diagram of the printing section 2000.

In FIG. 1(A), numeral 10 a controller (CNTRU) which executes main control of the reading section 100. The controller 10 is equipped with a CPU 10-1, a ROM 10-2 storing a control program, of the kind shown in, e.g., FIG. 12, executed by the CPU 10-1, and a RAM 10-3 which the CPU 10-1 employs as a working memory. The controller 10 controls the rotation of a motor 12 via a motor driver (MOTOR DR) 13, thereby causing the scanning unit 83 to read and scan the original image. At this time the controller 10 controls the lighting of the exposure lamp 85 via a constant-voltage control circuit (CVR). The controller 10 receives a print (start) command signal and other key operation signals from an operating unit (OPU) 16 and sets various printing operating modes. For example, the operating unit 16 is equipped with a printing mode setting switch, not shown. In response to this command, the controller 10 sets an operating mode in such a manner that when the command is, e.g., an expression mode command, printing in a high-resolution half-toning mode is performed with regard to characters and line images and with high tonality with regard to photographic images. Alternatively, when the command is a copy mode command, an operating mode is set in such a manner that each of the color-separated signals is color-synthesized on one sheet of transfer paper. When the command is a command for forming an original print image for press, an operating mode is set in such a manner that each original print image is formed on transfer materials the number whereof corresponds to the number of color separations. There are various other commands as well. The controller 10 transmits the printing operating mode to the printing section 2000 via a communication line 24.

Numeral 1 in FIG. 1(A) denotes a synchronizing signal processor (SYNC CNTR). Based on a BD signal (the horizontal synchronizing signal of the printing section) transmitted by the printing section 2000 via a line 22, the processor 1 generates various timing signals on the reader side synchronized to the BD signal. Numeral 2 denotes a contact-type color CCD sensor (87) for reading the image of an original in synchronization with a horizontal synchronizing signal (RHSYNC signal) of the reading section from the synchronizing signal processor 1, and for outputting read image signals 5. The read image signals 5 are outputted, e.g., int he order C signal, G signal and Y signal, for each and every pixel. Since the CCD sensor comprises five chips in the present embodiment, in actuality signals are generated on five channels simultaneously. Numeral 3 denotes a signal processor (SPU) which executes wave-shaping processing such as edge enhancement in order to prevent attenuation of high-frequency components of the read image signal 5, by way of example.

Numeral 6 denotes an image processor comprising an analog processor (APU) 7, a buffer memory (MEM) 8 and an image processing unit (IPU) 9. The analog processor 7 separates C, G and Y signals of every pixel into a C signal, G signal and Y signal of every color. Next, red (R), green (G) and blue (B) color signals for every pixel are formed from the separated C, G and Y signals. This color signal formation is performed by the following processing:

$$(R) = (Y) - (G)$$

$$(G) = (G)$$

$$(B) = (C) - (G)$$

Each of the R, G and B signals so obtained is a brightness signal, and the relationship between brightness and output voltage is linear. This is further subjected to a density (LOG) conversion and into eight-bit density data (image data) of each of the colors Y, M, C by an A/D converter. The Y, M, C image data is composed of five channels of the CCD chip, and there is no synchronism between channels. The buffer memory 8 stores the five channels of Y, M and C image data in such a manner that they will all appear together. That is, 1024×5 pixels of the data arrayed in interdigitated fashion in the main scanning direction are stored so as to essential be on one straight line. Thereafter, with regard to the Y, M, C image data in the buffer memory 8, a desired color signal is selected by the controller 10, and a selected color signal is sent to the image processing unit (IPU) 9 color by color. The IPU executes shading correction processing for correcting distributed light, masking processing for correcting color tone, etc. Eight-bit video data per pixel of the results of processing is sent from the IPU 9 to the printing section 2000 via signal line 11.

As shown in FIG. 1(B), numeral 2500 denotes a controller (CNTRU) which executes main control of the printing section 2000. The controller 2500 includes a CPU 2110, a ROM 2502 storing a control program, of the kind shown in, e.g., FIGS. 13(A), (B), executed by the CPU 2210, a RAM 2504 which the CPU 2110 employs as a working memory, and an A/D converter 2503 for converting analog detection signals from various external sensor circuits into digital signals. Thus, the controller 2500 controls the rotation of a driving motor 2285 to rotate a photosensitive drum (PHD) 2900 and a transfer drum (TD) 2296 at constant speeds. The amount of charge on the surface of the photosensitive drum 2900 sensed by a potential sensor 2600 is inputted via a potential measuring unit (PMU) 2700 and is A/D converted and read in. Furthermore, an image top signal (ITOP) sensed by a sensor 2800 is read in. Also, signals indicative of humidity and temperature, which are sensed by a humidity sensor 2298 and temperature sensor 2299 are A/D converted and read in. These are used in control, such as in correction of printer developing characteristics. The controller 2500 exchanges a variety of information with the controller 10 of the reading section via the communication line 24.

Numeral 2160 denotes a tone control circuit (TCC), the main functions of which are to establish synchronism between an image clock signal (RCLK) of the reading unit 100 and an image clock signal (VCLK) of the printing unit 2000, subject input video data to screen half-toning processing (converting into half-tone dot)

when necessary, tone-convert input video data or video data following screen half-toning processing, depending upon the image output mode, and convert tone-converted video data into a binary-coded signal, which conforms to the density of the data, by means of pulse-width modulation. Numeral 2200 denotes a laser driver (LD) for on/off driving the beam of, e.g., a semiconductor laser (LU), in accordance with the PWM signal from the tone control circuit 2160.

Figure 2A:
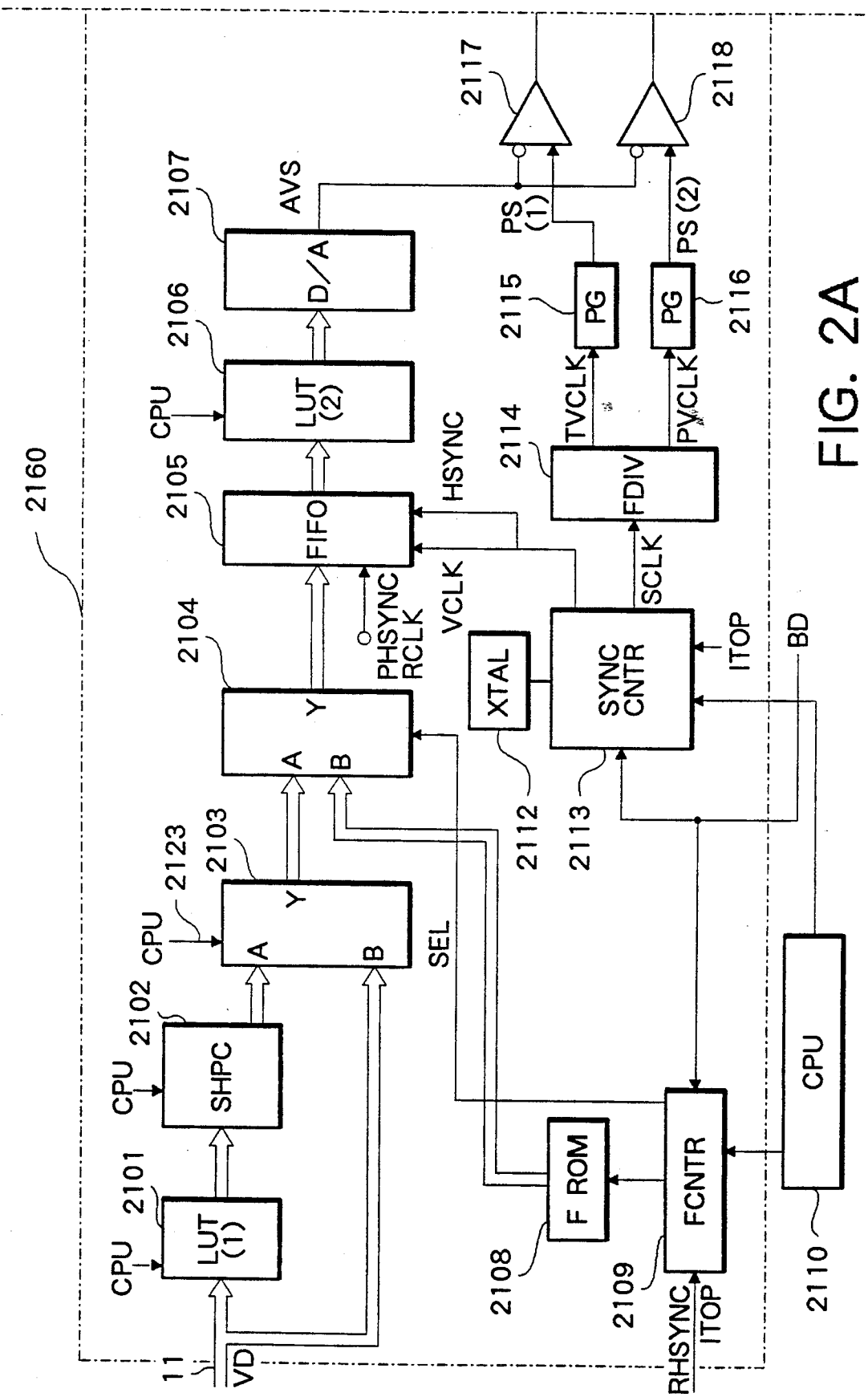
FIG. 2(2A, 2B) is a block diagram illustrating the details of a tone control circuit according to the embodiment.
Figure 2B:
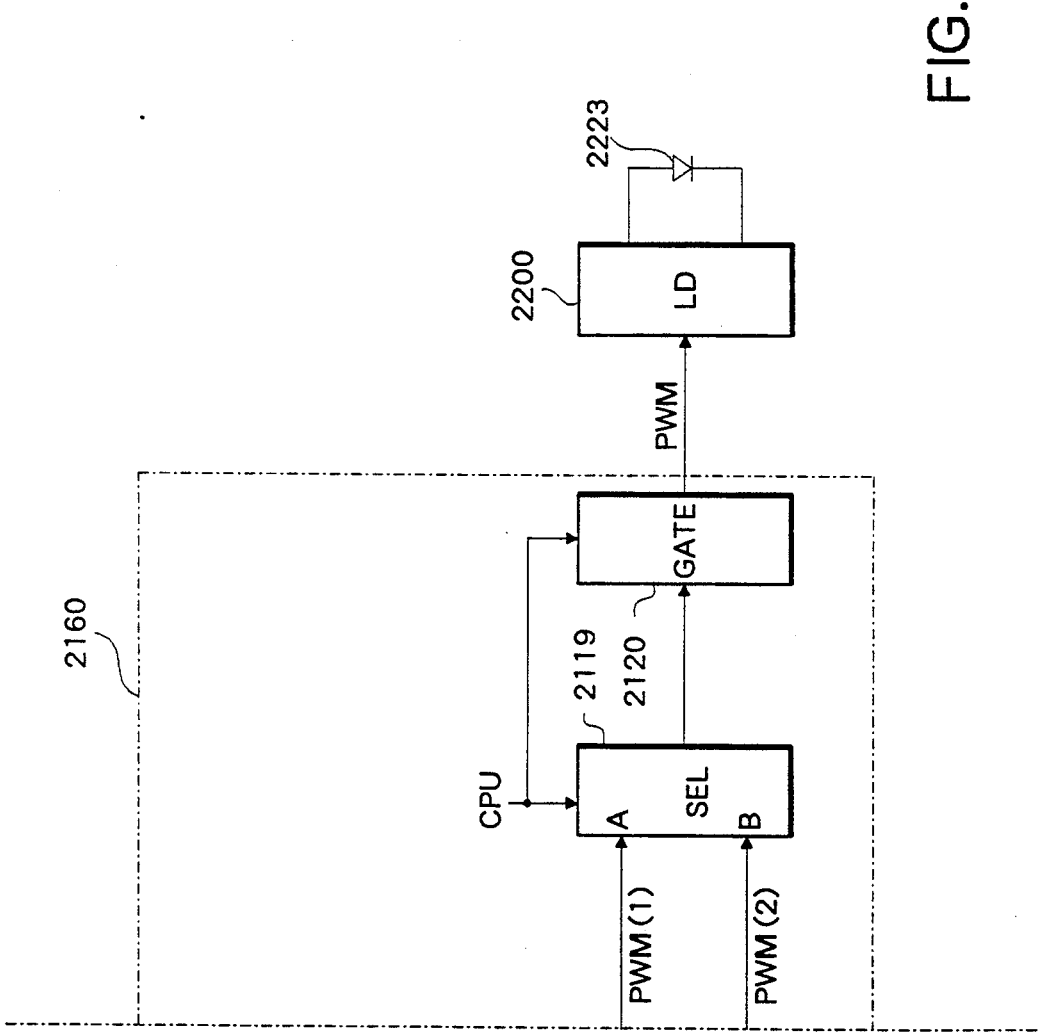

FIG. 2 is a block diagram illustrating the details of the tone control circuit of the embodiment. One of the video data inputs enters a look-up table [LUT (1)] 2101 for screen half-toning processing, where the input data is converted into video data for screen half-toning processing. The LUT (1) in the present embodiment is composed of a ROM or RAM. The LUT (1) is a conversion table which, when screen half-toned video data is outputted by an electrophotographic process via a screen half-tone processing circuit 2102, is for converting the input video data in advance in such a manner that the desired screen half-toned effect is obtained. This will now be described in greater detail.

The screen half-tone processing circuit (SHPC) 2102 applies screen half-toning, described below, to video data for screen half-tone processing outputted by the LUT (1). For example, the image data is divided into a predetermined area, the pixel density within the area is converted into screen half-toned video data in a form concentrated and typified in the density of the central pixel position, and this is inputted to the A-side terminal of a selector 2103.

The other video data input is applied to the B-side terminal of the selector 2103 for the time when screen half-toning processing is not executed. In accordance with a select signal 2123 from a CPU 2110, the selector 2103 selects and outputs the video data after screen half-toning or before screeen half-toning. In the mode for forming an original image for a printing press, for example, it is desired that the video data following screen half-toning be selected and outputted. When an ordinary color copy is outputted, both video data after screen half-toning and video data before screen half-toning can be selected. In other words, various printing modes are conceivable and various signal processing combinations between processing circuits, described below, arise in accordance with these printing modes.

Next, the video data selected by the selector 2103 is inputted to the A-side terminal of a selector 2104. Font data from a font ROM (FROM) 2108 is inputted to the B-side terminal of the selector 2104. The font data is for combining (superimposing) character or symbol font patterns with a portion of the selected video signal. As will be described below, the CPU 2110 sets a font code and an address for combining the same, thereby enabling a font pattern to be combined at one or several locations of the image data of each color print image.

Eight-bit video data outputted by the selector 2104 enters a buffer memory (FIFO) 2105 in synchronism with an RHSYNC signal and RCLK signal from the reading section 100. The stored video data are read out in synchronism with a horizontal synchronizing signal (HSYNC signal) and video clock signal (VCLK signal) from a printer-side synchronizing control circuit (SYNC CNTR) 2113. In this way the speeds of the reading section 100 and printing section 2000 are coordinated.

The video data read out of the buffer memory 2105 is inputted to a look-up table [LUT (2)] 2106 for printer characteristic correction. The LUT (2) is for preparing already corrected data in such a manner that the input video data is made to conform (output density tonality is increased and linearized) to the printer output characteristic (e.g., beam spot diameter, toner particle diameter, etc.). The details will be described later with reference to FIGS. 8(A) through (D).

The video data outputted by the LUT (2) is applied to a D/A converter 2107 to be converted into an analog video signal (AVS) that varies in stepped fashion. This analog video signal is applied to one input terminal of a comparator 2117 and one input terminal of a comparator 2118. Applied to the other input terminals of these comparators 2117, 2118 are respective pattern signals PS (1), PS (2) for binary coding (pulse-width modulating) the analog video signal in accordance with the density thereof. The pattern signal (1) is for reproducing or generating a line image and screen half-toned image, by way of example. In this case, resolution becomes a problem. Therefore, a pattern signal that has a frequency (e.g., 400 lines) the same as that of the video signal is used. The pattern signal (2) is for reproducing half-tone images. Since it is necessary to increase tonality in such case, the pattern signal used is such that the frequency will be one half (e.g., 200 lines) that of the above-mentioned pattern signal for the line image, by way of example. That is, the relationship is such that one pattern signal is generated per two pixels.

This will be described in accordance with the circuitry. A quartz oscillator (XTAL) 2112 generates a clock signal having a frequency which is more than four times that of the image clock signal. The synchronizing control circuit 2113 synchronizes the BD signal and the ITOP signal and produces the main scanning synchronizing signal (HSYNC signal) and the basic clock signal (SCLK signal). A frequency divider circuit (FDIV) 2114 frequency-divides the SCLK signal and produces clock signals (a TVCLK signal and a PVCLK signal) for pattern generation. The TVCLK signal is a clock signal which has a frequency twice that of the video signal and a duty ratio of 50%, by way of example. A pattern generating circuit 2115 generates the analog pattern signal (1) in accordance with the TVCLK signal. In the present embodiment, this signal is a triangular wave signal, by way of example. The comparator 2117 compares the analog video signal and the pattern signal (1) and outputs a PWM signal (1), which is obtained by pulse-width modulating the pertinent video density.

The PVCLK signal is a clock signal which has a frequency half (or two-thirds, etc.) that of the video signal and a duty ratio of 50%. A pattern generating circuit 2116 generates the analog pattern signal (2) in accordance with the PVCLK signal. In the present embodiment, this signal is a triangular wave signal, by way of example. The comparator 2118 compares the analog video signal and the pattern signal (2) and outputs a PWM signal (2), which is obtained by pulse-width modulating the pertinent video density.

In accordance with a control signal from a CPU 2110, a selector (SEL) 2119 selects and outputs the PWM signal (1) at its A terminal when a line image original is to be reproduced or a screen half-toned output is to be produced. When a half-tone image is reproduced, the PWM signal (2) at the B terminal of selector 2119 is selected and outputted.

This selection can be made at will and various combinations with other processing circuits are conceivable.

It is possible to adopt an arrangement in which a changeover signal from the CPU 2110 is not used as this changeover signal. Specifically, though not shown, well-known image area separating means can be provided for identifying, for every pixel of the video signal, whether the signal belongs to a line image area or a half-tone image area, and this image area separation can be employed as the changeover signal. With such an arrangement, a high-quality image faithful to the image tone of the original is obtained within one image. Thus, the selected PWM signal (1) or (2) is matched with operation of the transfer material by a gate circuit (GATE) 2120 and inputted to laser driver 2200. The semiconductor laser 2223 is driven at a constant current for a period of time corresponding to the pulse width of the PWM signal, and an electrostatic latent image is formed on the surface of the photosensitive drum 2900.

Figure 3:
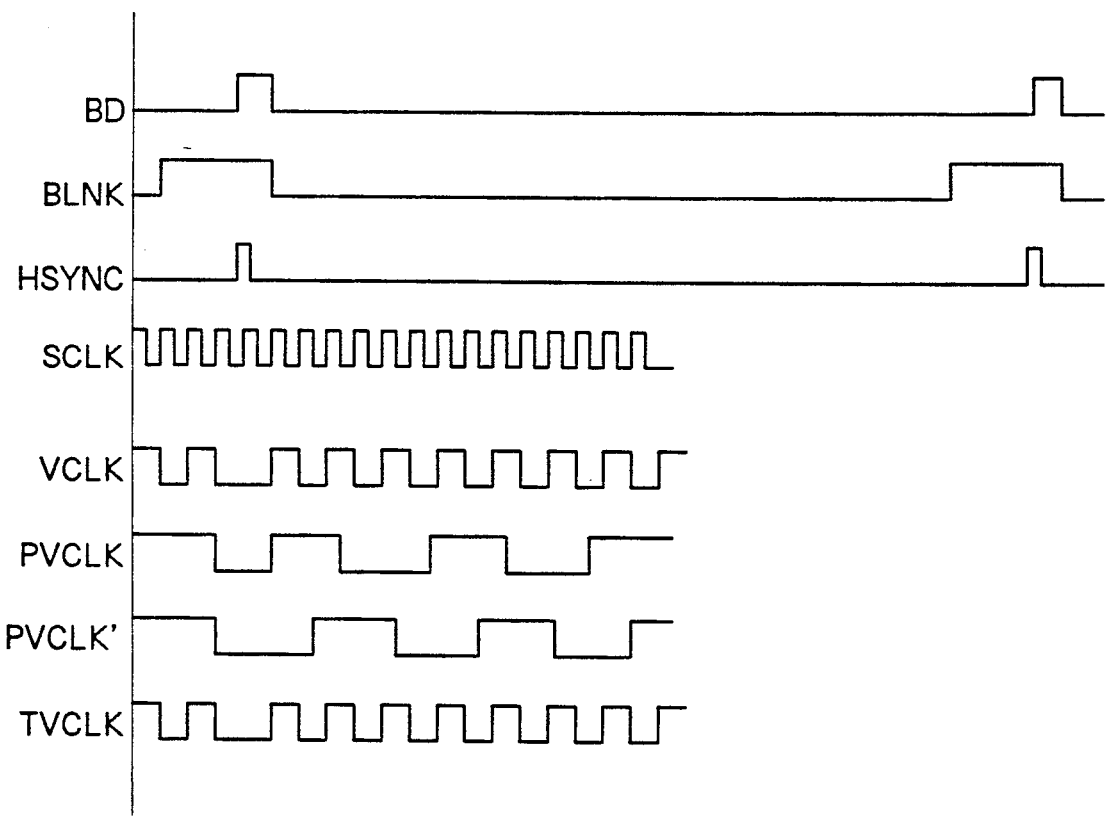
FIG. 3(A) is a timing chart of the principal signals of a printing section.
FIG. 3(B) is a block diagram illustrating the details of synchronizing control circuitry in the printing section.
Figure 3:
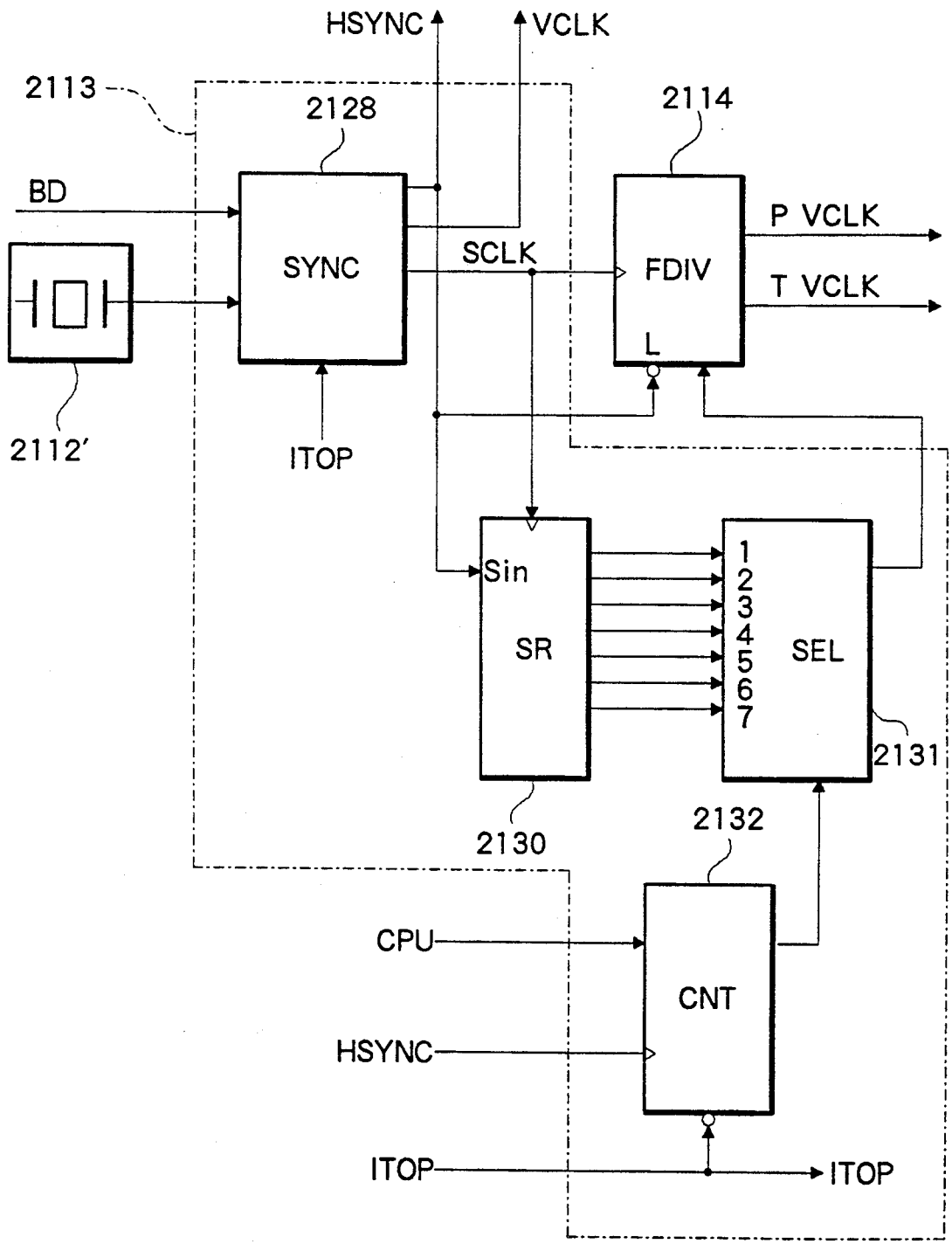

FIG. 3(A) is a timing chart of the principal signals used in the printing section. The timing chart illustrates examples of the horizontal synchronizing signal BD, blanking signal BLNK, reference clock signal SCLK, clock signals TVCLK, PVCLK for pattern generation, and video clock signal VCLK, etc.

FIG. 3(B) is a block diagram illustrating the details of the synchronizing control circuit section. In FIG. 3(B), a quartz oscillator 2112' generates a clock signal which is more than four times the frequency of the image clock signal. A synchronizing circuit (SYNC) 2128 outputs an HSYNC signal, VCLK signal and SCLK signal at timings synchronized to the BD signal, ITOP signal and clock, which are externally applied. The frequency divider circuit 2114, to which the SCLK signal is applied, outputs the TVCLK signal, which has a period the same as that of the VCLK signal and a duty ratio of 50%, and the PVCLK signal, which has a period twice (or three times, etc.) that of the VCLK signal and a duty ratio of 50%. Though not shown, a blanking signal is formed by a counter which counts a time period shorter than the period of the BD signal reset by the trailing edge of the BD signal.

The PVCLK' signal in FIG. 3(A) will now be described. The PVCLK' signal is useful when screen angle control is applied to the video data in a case where screen half-toning processing is not executed (i.e., at the time of ordinary half-tone image playback). This PVCLK' signal is a clock signal having a phase which is, e.g., 1.5 pixels latter than the HSYNC signal. When this is compared with PVCLK signal of the normal phase, it is found to lag by one pixel. In the present embodiment, at the time of, e.g., ordinary half-tone image playback, the PVCLK signal and PVCLK' signal are used upon being changed over every line or every several lines in the subsidiary scanning direction with respect to the HSYNC signal. For example, when changeover is made every line, this establishes 45° screen angle control.

In FIG. 3(B), the HSYNC signal enters a shift register (SR) 2130 and is shifted by the SCLK signal. The output of each stage of the shift register 2130 is connected to the input terminal of the selector 2131. Meanwhile, a counter circuit (CNT) 2132, upon being reset by the ITOP signal, is preset to count program information from the CPU 2110. The count program information is count sequence information for repeating 2 to 5, 5 to 6, etc., as the counted value output. The counter circuit 2132 counts the HSYNC signal in accordance with this information. For example, counting is performed in the manner 3→4→5→3→4→5 whenever the HSYNC signal is generated. The counted value is inputted to the selection terminal of a selector 2131. The latter selects and outputs the signal at an input terminal 3 when the counted value is 3, and selects and outputs the signal at input terminal 4 when the counted value is 4. The output of the selector 2131 enters a frequency dividing start terminal of the frequency divider circuit 2114. The latter is not counting since it has already been reset by the HSYNC signal. The frequency divider circuit 2114 starts the frequency-dividing operation at the moment the signal from the selector 2131 arrives. Thus, the PVCLK signal and TVCLK signal which differ in phase can be generated every line.

As for the relationship with the screen angle, let the screen angle $\theta$ be defined as follows:

$$\theta = \tan^{-1} b/a$$

The value of a is decided by the counted value in counter circuit 2132, and the value of b is decided by the count sequence. These are values which can be set at will by the CPU 2110.

<Description of Screen Half-toning Processing>

In half-toning processing described below, half-toning of the density of image data divided into a predetermined area (e.g., concentration and typification at the central pixel position of pixel density) and optimum screen angle control are performed at a stroke in real time.

First, the details of the look-up table [LUT (1)] for correcting screen half-toning will be described.

Figure 7:
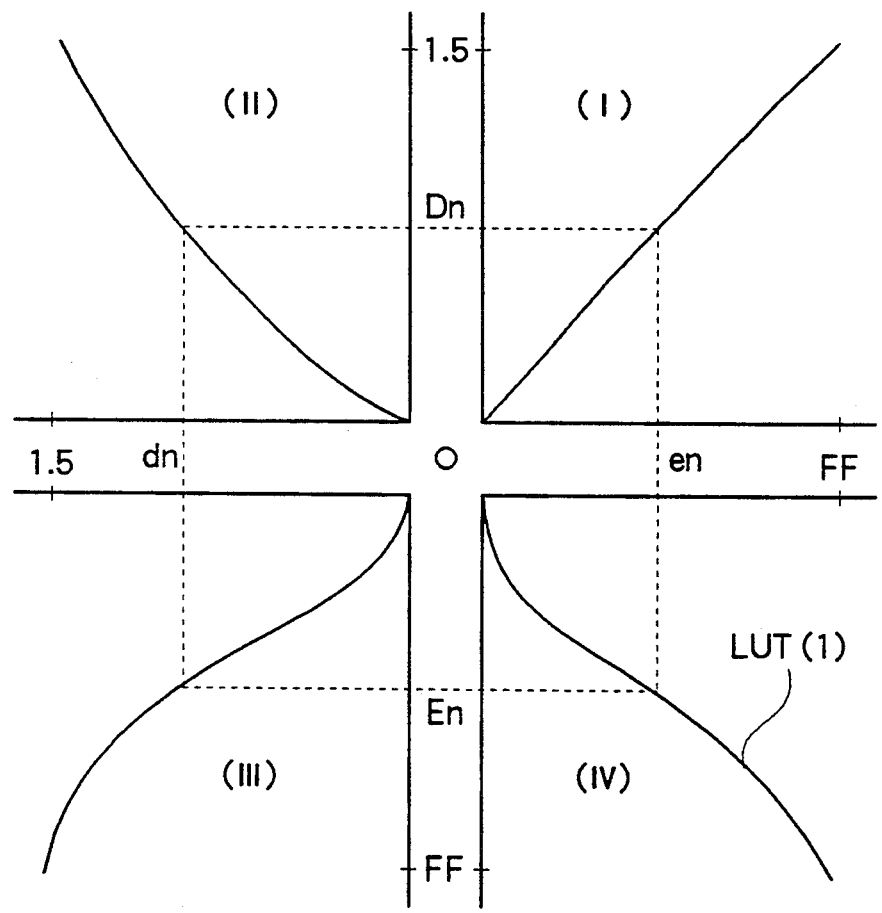
FIG. 7 is a view for describing the conversion characteristic of a LUT (1) according to the embodiment.

FIG. 7 is a view for describing the conversion characteristic of the LUT (1) of the present embodiment. The Y, M, C video data inputted to the printing section and the ink (or toner) concentration are linearly related. However, when screen half-toning processing, described below, is carried out, the linear relationship is no longer maintained. Accordingly, a density correction is applied to the inputted Y, M, C video data in advance. A first quadrant (I) in FIG. 7 indicates the relationship between input level before correction and ink density. Here the relationship is linear. That is, ink density along the vertical axis is that which prevails when printing is performed using color-separated print images outputted by the apparatus of the embodiment. A second quadrant (II) indicates the relationship between ink density and screen half-toned output density level. A third quadrant (III) indicates the relationship between screen half-toned output density level and corrected input level. A fourth quadrant (IV) incidates the relationship between input level before correction and input level after correction. This gives the conversion characteristic of LUT (1).

If the color-separated print images of the embodiment can construct an ideal screen image, the screen output densities of the third and fourth quadrants can be adopted as the screen density (%).

The actual table information is obtained by measurement, by way of example. For instance, when ink density $D_n$ is obtained as an input level $e_n$ before correction, a screen output density $d_n$ which will become the ink density $D_n$ is obtained. Next, an input level $E_n$ after correction is obtained which will become the screen output density $d_n$. It will thus suffice to fabricate the LUT (1) in such a manner that a corrected output level $E_n$ is obtained with respect to the input level $e_n$ before correction. All conversion levels corresponding to input levels 00H-FFH are thus obtained. When the conversion characteristic is different for every color, the LUT (1) also is fabricated for every color.

FIGS. 4(A)-(D) are views for describing screen half-toning processing pattern according to the embodiment. FIG. 4(A) illustrates an example regarding the C data. In FIG. 4(A), numeral 500 denotes one pixel. Each pixel is shown as an array from a starting address (0,0) of one image of data. Numeral 600 denotes a basic cell (a basic pattern for screen half-toning). This is a block unit for screen half-toning (concentrating and typifying pixel density at the density of the position of the central pixel, by way of example) the density within the area (a predetermined area) indicated by the solid lines in the Figure. The basic cell of the C data comprises 13 pixels, for example. The numerals (1-13) assigned to the pixels within the basic cell indicate the order of priority, which diminishes progressively from 1 to 13. With data of the same color, the same order of priority is assigned to the other basic cells.

It should be noted that the illustrated order of priority is one example made to conform to the printer characteristics of the embodiment, and that the invention is not limited thereto. Various other modifications are possible.

Screen half-toning processing of the pixel density within the basic cell is performed in accordance with the following equation (screen half-toning computation equation):

(output data of pixel of interest) =

(input data of pixel of interest) ×

(number of pixels in basic cell) − (order of priority − 1) × FFH where FFH is the maximum density (H represents hexadecimal notation).

This computation is performed moving the pixel of interest successively in the main scanning (MAIN) and subsidiary scanning (SUB) directions in the Figure. For example, when the pixel of interest is at the location where the order of priority is 11, we have (output density)=(input density)×13−(11−1)×FFH Since the order of priority is 11, which is low, the subtracted density [(order of priority −1)×FFH] is larger and the density of this pixel position is relatively low. Further, as a result, when (output density)<0 holds, the output density is clamped at "00H". Conversely, when (output density)>FFH holds, the output density is clamped at "FFH".

Similarly, when the pixel of interest is at the location where the order of priority is 1, we have (output density)=(input density)×13−(1−1)×FFH Since the order of priority is 1, the substracted density is zero. Thus, pixel concentration is concentrated and typified toward the central pixel position of the basic cell. An original screen image thus screen half-toned has excellent ink spread and is stable.

Numeral 700 denotes a matrix. This illustrates a block unit in which the screen half-toning processing pattern shown is used repeatedly in the main and subsidiary scanning directions. The matrix size of the C data is, e.g, (13×13) pixels. As is evident from the drawing, an original image of any size can be processed when a plurality of these matrices are connected in the main and subsidiary scanning directions. According to this embodiment, this matrix pattern is stored in memory utilizing its periodicity, and the abovementioned pattern is repeated and used in realtime, thereby making it possible to conserve the pattern memory and to perform processing at high speed.

Figure 4:
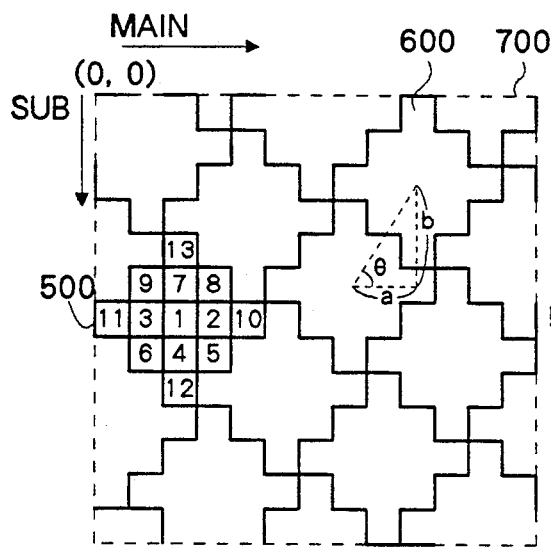
FIGS. 4(A)–(D) are views for describing screen half-toning processing patterns according to the embodiment.
Figure 4:
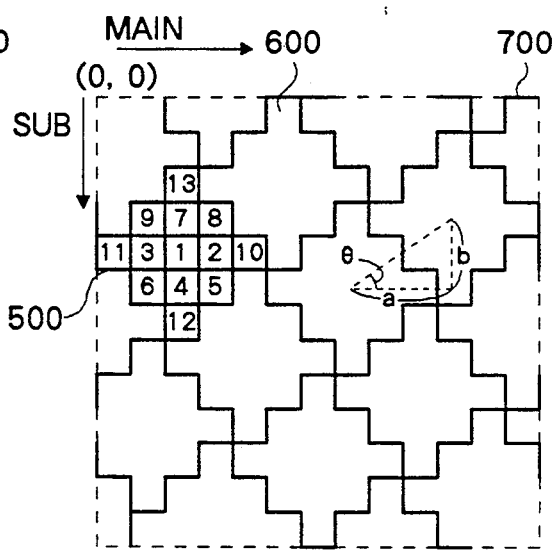
Figure 4:
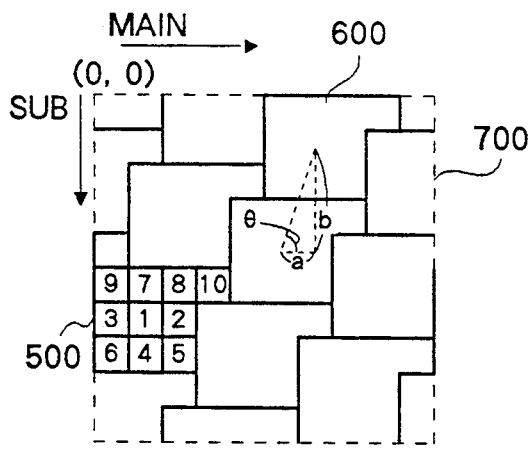
Figure 4:
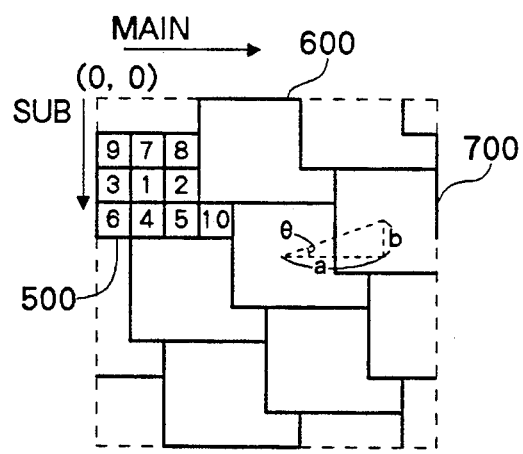

The triangle in FIG. 4 indicates the screen angle $\theta$. This screen angle represents the inclination of the alignment of the basic cell 600. When a and b are decided in FIG. 4, the screen angle $\theta$ is decided as follows:

$\theta = \tan^{-1} b/a$

The screen angle given is $\theta = 56.3°$.

FIG. 4(B) illustrates an example of a screen half-toning processing pattern for M data. In FIG. 4(B), the basic cell 600 comprises 13 pixels and has the same shape as that in FIG. 4(A). Here $\theta = 33.7°$ is given as the screen angle. A comparison of FIG. 4(B) with FIG. 4(A) shows that the basic cell 600 of the M data differs (in phase angle) in terms of the way it starts from the address (0,0). Consequently, the two center pixel positions do not overlap. In other words, the principal density information does not overlap. As a result, neither the C ink nor the M ink is crushed at printing. This assures high-quality, stable printing.

FIG. 4(C) illustrates an example of a screen half-toning processing pattern for BK data. Here the BK data is generated from the C, M, Y data by a well-known method. In FIG. 4(C), the basic cell 600 comprises 10 pixels and the shape thereof differs from that in FIGS. 4(A), (B). Though the invention is not limited to this shape, it is suitable in order to give $\theta = 71.6°$ as the screen angle, by way of example. The phase angle from the address (0,0) also differs.

FIG. 4(D) illustrates an example of a screen half-toning processing pattern for Y data. In FIG. 4(D), the basic cell 600 comprises 10 pixels. Though the invention is not limited to this shape, it is suitable in order to give $\theta = 18.4°$ as the screen angle, by way of example. The phase angle from the address (0,0) also differs.

Figure 5:
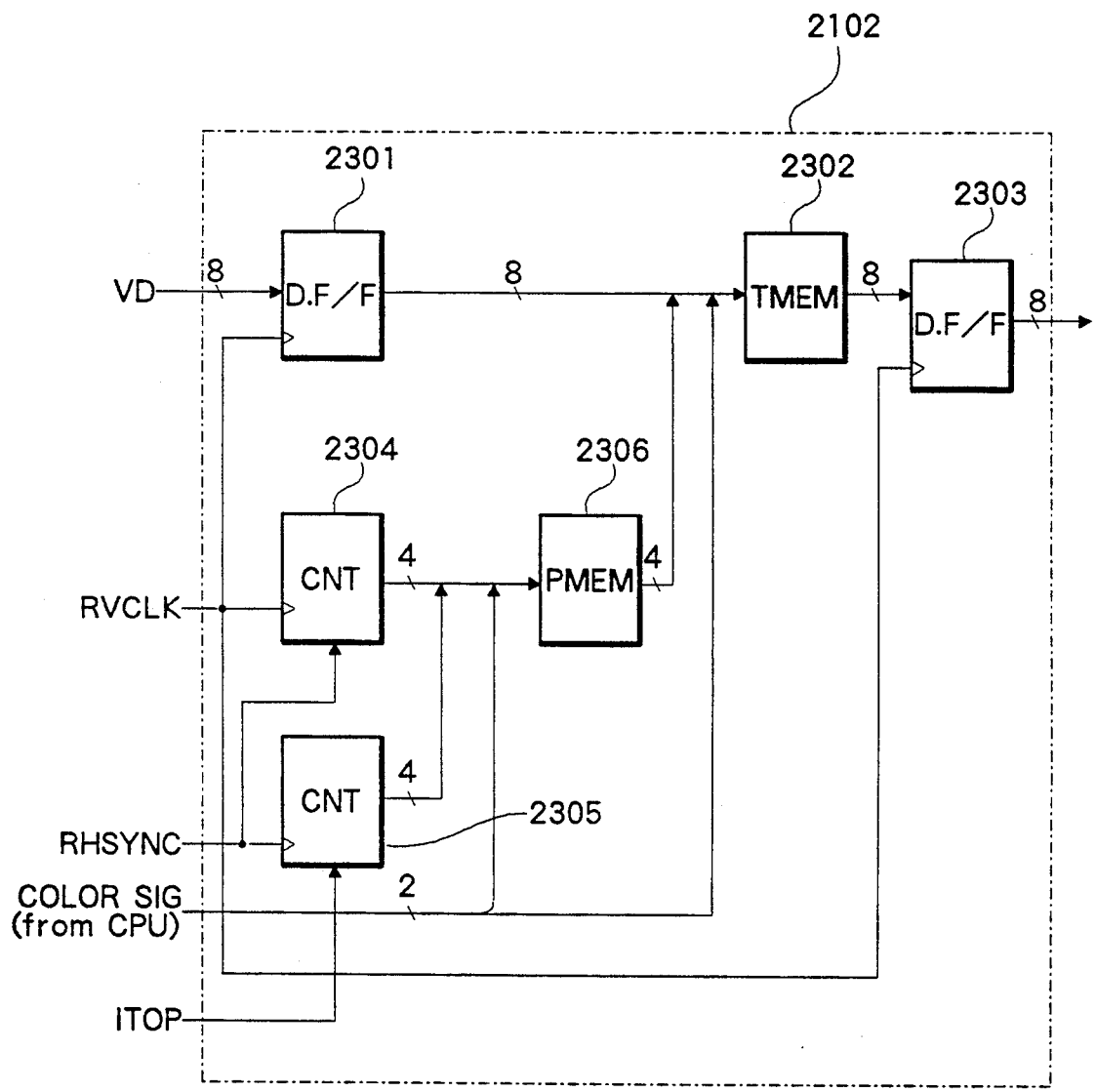
FIG. 5 is a block diagram illustrating a screen half-toning processing circuit according to the embodiment.

FIG. 5 is a block diagram of the screen half-toning processing circuit of the embodiment. In FIG. 5, screen half-toning video data (VD) outputted by the LUT (1) is latched in a D-type flip-flop (D F/F) 2301 in synchronism with the RVCLK signal. Upon being reset by the RHSYNC signal, the counter (CNT) 2304 counts the RVCLK signal. That is, main scanning-direction addresses of FIGS. 4(A) -(D) are formed. Upon being reset by the ITOP signal, a counter (CNT) 2305 counts the RHSYNC signal. That is, subsidiary scanning-direction addresses of FIGS. 4(A)-(D) are formed.

Though not illustrated, count initializing data is set in the counters 2304, 2305 in accordance with the processing color from the CPU 2110, and each counter repeats the counting operation at the counted value corresponding to the initializing data. For example, when the C data or M data is processed, the counting operation is repeated at the respective counted values 0 -12. When the BK data or Y data is processed, the counting operation is repeated at the respective counted values 0-9.

Numeral 2306 denotes a pattern memory (PMEN) which stores the screen half-toning processing patterns (data indicative of the order of priority) of FIGS. 4(A)-(D). Thus, the order-of-priority data of any one of the matrices of FIGS. 4(A)-(D) is read out successively by the color selection signals (Y, M, C, BK) from the CPU 2110 and as the main and subsidiary scanning progresses. Numeral 2302 denotes a table memory (TMEN) to which are applied input data indicative of the pixel of interest and the corresponding order-of-priority data, and which delivers output data indicative of the pixel of interest in accordance with the above-mentioned screen half-toning computation equation. At such time a table in a case where the number of pixels in the basic cell is 10 or 13 is employed in accordance with the color selection signal from the CPU 2110, in the manner described above. The output data indicative of the pixel of interest thus read is set in the D F/F 2303 in synchronism with the RVCLK signal and is outputted to the circuit of the next stage.

The above-mentioned memories 2302, 2306 may be ROM's or RAM's. Instead of adopting a look-up table method relying upon memories, an arrangement can be adopted in which hardware-type arithmetic circuitry is employed.

Figure 6:
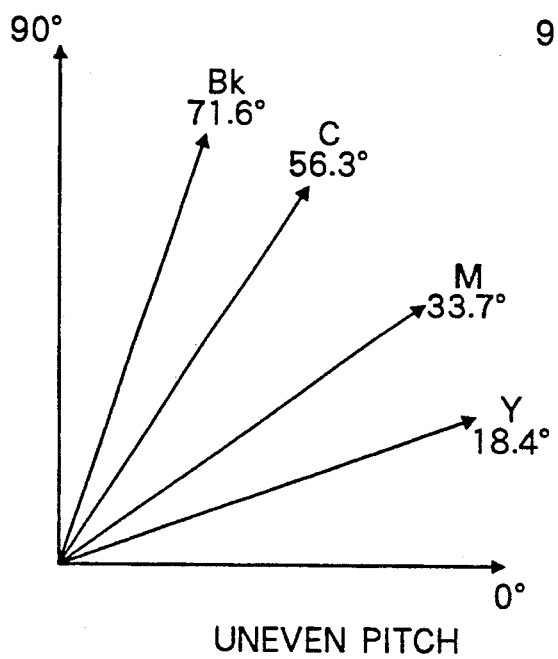
FIG. 6(A) is a view showing an example of the distribution of screen angles according to the embodiment.
FIG. 6(B) is a view showing an example of the distribution of screen angles used in the conventional printing field.
FIG. 6(C)–(H) are views showing examples of moire patterns.
Figure 6:
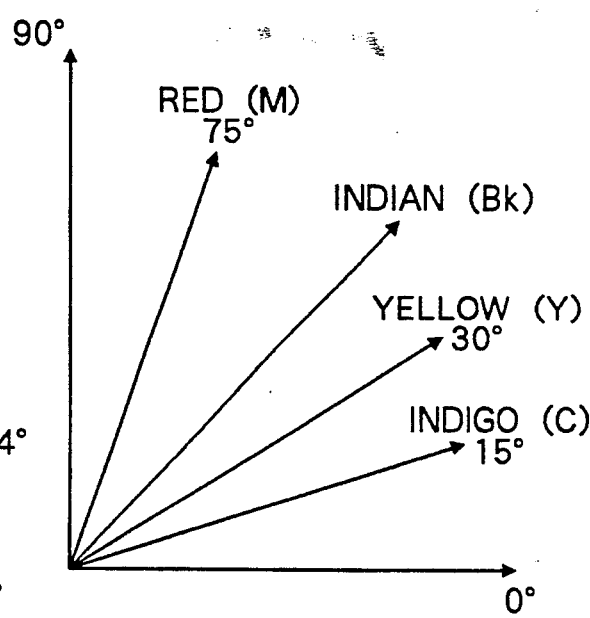
Figure 6:
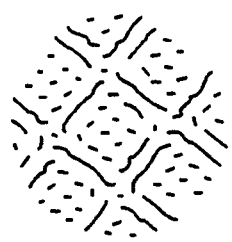
Figure 6:
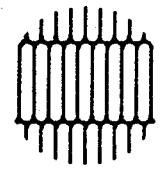
Figure 6:
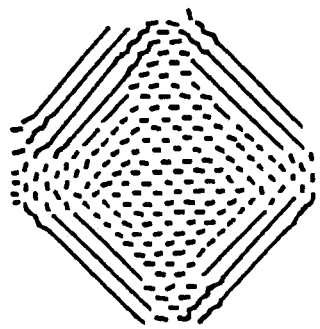
Figure 6:
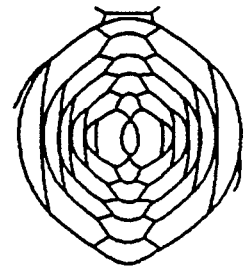
Figure 6:
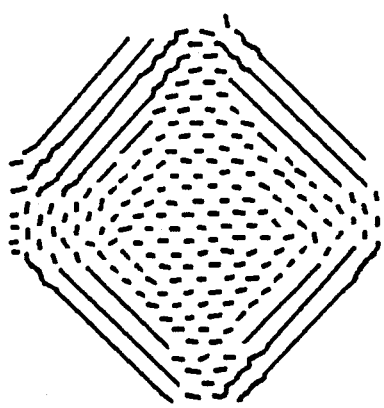
Figure 6:
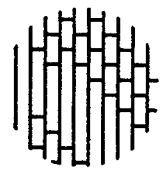

FIG. 6(A) is a view showing an example of the distribution of screen angles according to the embodiment, FIG. 6(B) is a view showing an example of the distribution of screen angles used in the conventional printing field, and FIGS. 6(C)-(H) are views showing examples of moire patterns. FIG. 6(C) shows a moire with a 10° difference, FIG. 6(D) a moire based on a ripple screen, FIG. 6(E) a moire with a 5° difference, FIG. 6(F) a moire based on a concentric-circle screen, FIG. 6(G) a moire with a 2° difference, and FIG. 6(H) a moire based on a ripple screen +half-tone dot.

In the field of printing technology, (13×13) glass fibers can be bundled together, by way of example. Therefore, it is easy to accurately maintain a distributed screen angle at the time of printing. On the other hand, in the present embodiment a laser beam printer is employed, so that irregular rotation of the polygon mirror 2289 and photosensitive drum 2900 must be taken into consideration. That is, an irregularity in the amount of laser irradiation per time is caused by combining both rotational irregularities, and this irregularity in irradiation has an influence at the time that the latent image is formed on the photosensitive drum and, hence, when development is performed. This appears as an irregular shade (irregular pitch) in the output image. When this is considered in correspondence with the screen half-toning processed image, this pitch irregularity may be considered as a high-frequency component having an angle of 0° (main scanning) or 90° (subsidiary scanning). In general, moire appears in a color print image in which the angular difference with the pitch irregularity is small. Consequently, when image formation is carried out at an angle the same as that in the printing method, the M and C components are easy to see as moire with the pitch irregularity. This becomes equivalent to the "moire based on a ripple screen +half-tone dot" of FIG. 6(H). Accordingly, in the present embodiment, the moire is made difficult to see by adopting a screen angle in which the Y component, which is not noticeable with respect to spectral luminous efficiency, is close to 0°. BK originally is a color easy to see. However, with regard to the BK component in the present embodiment, data is corrected in the reading section 100 in such a manner that a low-density area will not be printed as density with respect to the minimum value of each color component. The arrangement, however, is not shown in the drawings. Consequently, since pitch irregularity is irregularity in the amount of light, as mentioned above, there is a characteristic in which light density is easier to see than heavy density. Therefore, moire with pitch irregularity is difficult to see even if an angle is adopted in which black is near 0° or 90°

FIGS. 8(A) through (D) are views illustrating the conversion characteristic of the LUT (2) for the printer output characteristic of the present embodiment. It is necessary that the printer output image be made to conform to the characteristic of the printer used and that the input data level and printer output density have a linear characteristic. For example, in a case where the toner particle diameter is not small enough in comparison with the beam spot diameter, there will be occasions where a maximum of only 32 toner particles will attach even if the output beam is provided with 256 tones. This is disadvantageous since, in essence, only 32 tones will appear. Accordingly, if an area of (2×2) dots or, in general, (n×m) dots, is set as the printer output unit and this is considered in terms of the density in the above-mentioned area, then linear tone expression of e.g., 32×2=64 tones, is possible, and expression up to 256 tones can be achieved.

In a case where this is carried out, it will suffice to PWM-convert image data of, e.g., m pixels by a pattern signal (triangular wave) whose period is m times that of the pixel period with regard to the main scanning direction. With regard to the subsidiary scanning direction, it is desired to obtain effects equivalent to those of main scanning regarding n lines. However, equivalent effects cannot be obtained with a system in which identical main scanning is repeated in the subsidiary scanning direction. Accordingly, plural types of tone conversion tables are provided with regard to the subsidiary scanning direction and these tables are used upon being changed over in a predetermined sequence, whereby effects equivalent to those in the main scanning direction can be obtained.

The LUT (2) is such a table and takes into account the overall output characteristic of the laser beam printer of the embodiment. A relationship (EV characteristic) between beam pulse width and photosensitive drum surface potential, and a relationship (VD characteristic) between photosensitive drum surface potential and output image density are considered as laserbeam printr output characteristics. Since the EV characteristic has an approximately linear characteristic, it will be described here as a table for correcting the VD characteristic. The VD characteristic is a characteristic which differs depending upon whether image data screen half-toning processing is performed, the frequency of the pulse-width modulated signal (pattern signal) and the developer used, etc. Consequently, in the present embodiment, a plurality of tables are prepared in advance in accordance with the VD characteristic, and the CPU 2110 selects and uses a table whenever necessary.

Here a case will be described in which the frequency of the pattern signal to the comparators is one-half or one-third that of the video signal frequency, without screen half-toning processing being performed.

FIG. 8(A) is a view illustrating the VD characteristic of the embodiment. The drum surface potential along the horizontal axis indicates a differential potential (contrast potential) between the surface potential of the photosensitive drum and the developing bias potential. FIG. 8(B) is a view showing an example of a characteristic in which the VD characteristic of FIG. 8(A) is linearly converted. That is, the object can be attained by interchanging the horizontal and vertical axes of FIG.

8(A) so that the characteristic table of FIG. 8(B) is obtained. In the present embodiment, however, it is desired to achieve a further improvement in the tonality of the output image (especially the tonality of highlight portions). Accordingly, the conversion tables are used upon being changed over every line or every several lines in accordance with one-half or one-third the pattern signal frequency and at a period of two lines or three lines in the subsidiary scanning direction, thereby linearizing tonality and concentrating the screen halftone dots.

FIG. 8(C) is a view showing a correction table characteristic of an embodiment used in a case where the pattern signal frequency is one-half the video signal frequency. In FIG. 8(C), the table of characteristic ① is such that the output level initially rises to the level FFH at a slope twice that of the curve of FIG. 8(B), after which it is constant until the input level becomes FFH. The table of characteristic ② is such that the level 00H is maintained until the table output of characteristic ① becomes level FFH, after which the characteristic rises to the level FFH at a slope twice that of the curve of FIG. 8(B). In this example, the pattern signal frequency is one-half, so that an output density of one dot is formed by two pixels of the video signal. With regard to the subsidary scanning direction also, two lines are adopted as the period and the tables of ① and ② of FIG. 8(C) are used upon being changed over every line. In this way density is made heavier by table ① and lighter by table ②. As a result, an effect is obtained in which an output density of one dot is formed by two lines in the subsidiary scanning direction. It should be noted that the table characteristics are not limited to those of and ① and ②.

FIG. 8(D) is a view illustrating a correction table characteristic of an embodiment used in a case where the pattern signal frequency is one-third the video signal frequency. As described above, the VD characteristic depends upon the pattern signal frequency. However, the same VD characteristic is used in this explanation to simply the description. In FIG. 8(D), the table of characteristic ③ is such that it initially rises to the level FFH at a slope three times that of the curve of FIG. 8(B), after which it is constant until the input level becomes FFH. The table of characteristic ④ is such that the level 00H is maintained until the table output of characteristic ③ becomes level FFH, after which the characteristic rises to the level FFH at a slope 1.5 times that of the curve of FIG. 8(B). In this example, the pattern signal frequency is one-third, so that an output density of one dot is formed by three pixels of the video signal. With regard to the subsidiary scanning direction also, three lines are adopted as the period and the tables of ③ and ④ of FIG. 8(C) are used upon being changed over every line. For example, changeover is made in the manner ④→③→④. In this way shading is applied every line and an effect is obtained in which an output density of one dot is formed by three lines in the subsidiary scanning direction. It should be noted that the table characteristics are not limited to those of ③ and ④.

In actuality, the VD characteristic differs depending upon the pattern signal frequency, and the tables of FIGS. 8(C) and (D) are formed in accordance with the different VD characteristics.

Further, formation of the abovementioned tables is not limited to cases in which the pattern signal frequency is one-half or one-third of the video signal frequency. The tables can be formed in a similar manner with regard to other frequencies as well.

Figure 9:
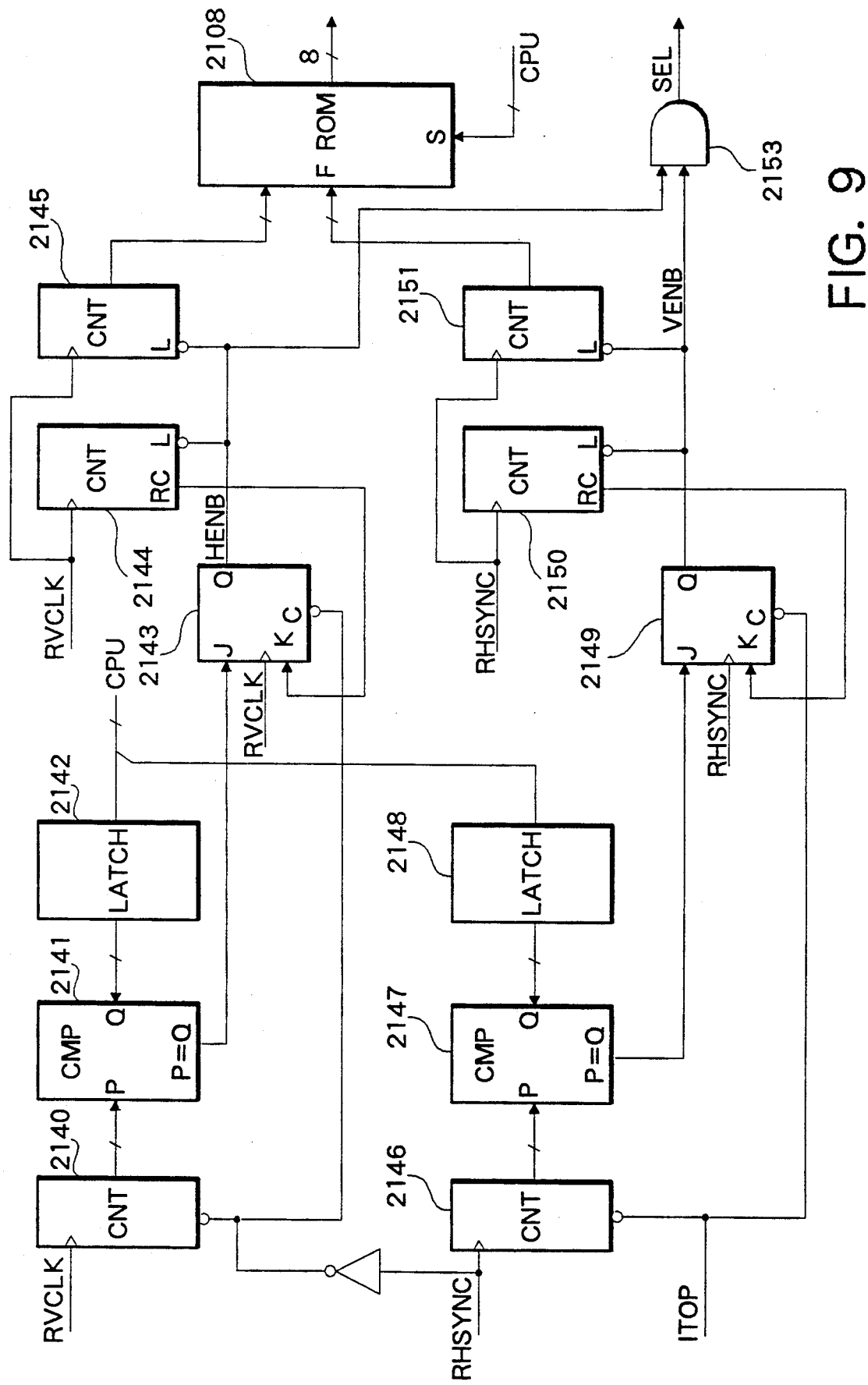
FIG. 9 is a block diagram ilustrating the details of a font control circuit according to the embodiment.

FIG. 9 is a block diagram illustrating the details of the font control circuit of the embodiment. The CPU 2110 applies data to the terminal S of a font ROM (FROM) 2108 to select the font that is to be printed. Main scanning address data indicating the font printing position is latched in a latch circuit (LATCH) 2142, and subsidiary scanning address data is latched in a latch circuit 2148. The address data in the latch circuit 2142 is applied to the Q terminal of a comparator (CMP) 2141, and the address data of the latch circuit 2148 is applied to the Q terminal of a comparator 2147. A counter (CNT) 2140 is reset by the RHSYNC signal and then begins counting the RVCLK signal. In other words, the number of pixels in the main scanning direction is counted. A counter 2146 is reset by the ITOP signal and then begins counting the RHSYNC signal. Thus, the number of pixels in the subsidiary scanning direction is counted.

The pixel number in the counter 2140 enters the P terminal of the comparator 2141. When the relation P=Q is satisfied, the comparator 2141 outputs a logical "1" level at the terminal P=Q. This is the character output position in the main scanning direction. The "1" level is applied to the J terminal of a flip-flop circuit (F/F) 2143 which, in response to the next RVCLK signal, sends an HENB signal to the "1" level. A counter 2145 starts counting the RVCLK signal in synchronism with the "1" level of the HENB signal, and the output of this counter is provided as the main scanning address of the font ROM 2108. A counter 2144 also starts counting the RVCLK signal in synchronism with the "1" level of the HENB signal. When a predetermined number is counted, this counter sends its RC terminal to the logical "1" level, which is inputted to the K terminal of the F/F 2143. In response to the next RVCLK signal, the HENB signal of the F/F 2143 reverts to the logical "0" level. As a result, the counters 2144, 2145 stop counting and the outputs thereof are reset. In accordance with the foregoing, the HENB signal is a signal which turns on every line at the pertinent character position in the main scanning direction.

Meanwhile, the line number in the counter 2146 is applied to the P terminal of the comparator 2147. When the relation P=Q is satisfied, the comparator 2146 outputs a logical "1" level at the terminal P=Q. This is the character output position in the subsidiary scanning direction. The "1" level is applied to the J terminal of a flip-flop circuit (F/F) 2149 which, in response to the next RHSYNC signal, sends a VENB signal to the "1" level. A counter 2151 starts counting the RHSYNC signal in synchronism with the "1" level of the VENB signal, and the output of this counter is provided as the subsidiary scanning address of the font ROM 2108. A counter 2150 also starts counting the RHSYNC signal in synchronism with the "1" level of the VENB signal. When a predetermined number is counted, this counter sends its RC terminal to the logical "1" level, which is inputted to the K terminal of the F/F 2149. In response to the next RHSYNC signal, the VENB signal of the F/F 2149 reverts to the logical "0" level. As a result, the counters 2150, 2151 stop counting and the outputs thereof are reset. In accordance with the foregoing, the VENB signal is a signal which turns on every line at the pertinent character position in the subsidiary scanning direction. The HENB signal and the VENB signal enter an AND gate 2153, which forms a signal SEL at its output side.

Font patterns can thus be combined at any position of an output image. The CPU 2110 is capable of suitably altering the data latched in the latch circuits 2142, 2148 and the font selection data, whereby a plurality of different fonts can be combined at any position of an image.

Figure 10:
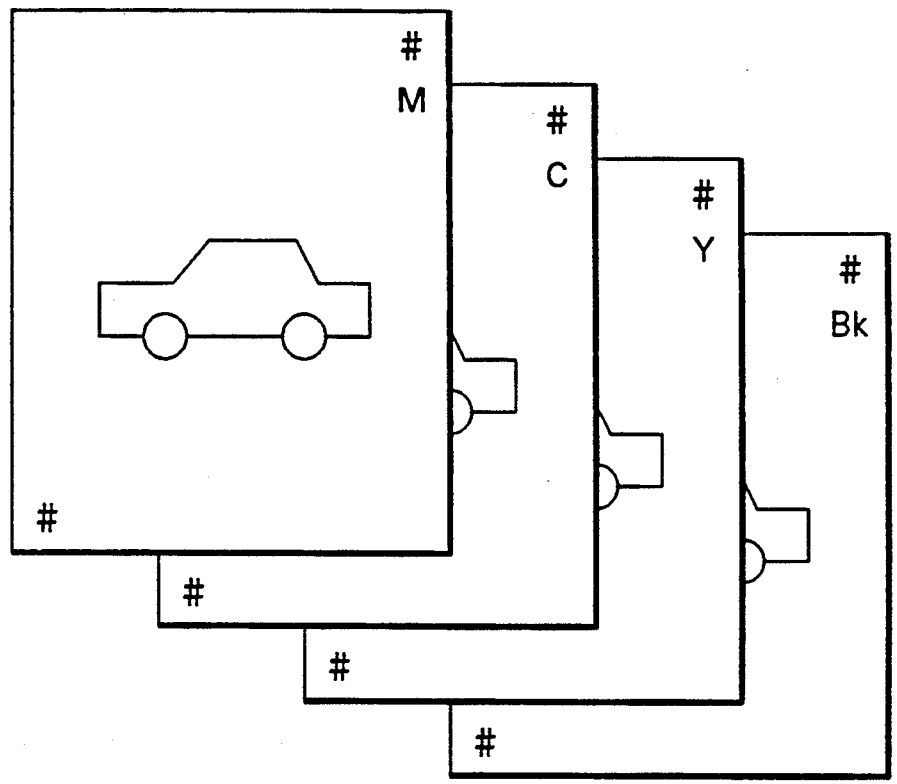
FIG. 10 is a view illustrating an example of an output image font-combined by a font control circuit according to the embodiment.

FIG. 10 is a view showing an example of an output image in which fonts are combined by the font control circuit of the embodiment. In FIG. 10, "#" is a registration mark for positioning, and "M, C, Y, Bk" are color information marks for identifying the respective color print images. The others are the color-separated print images of an original image read by the reader 100.

<Flowcharts>

Figure 12:
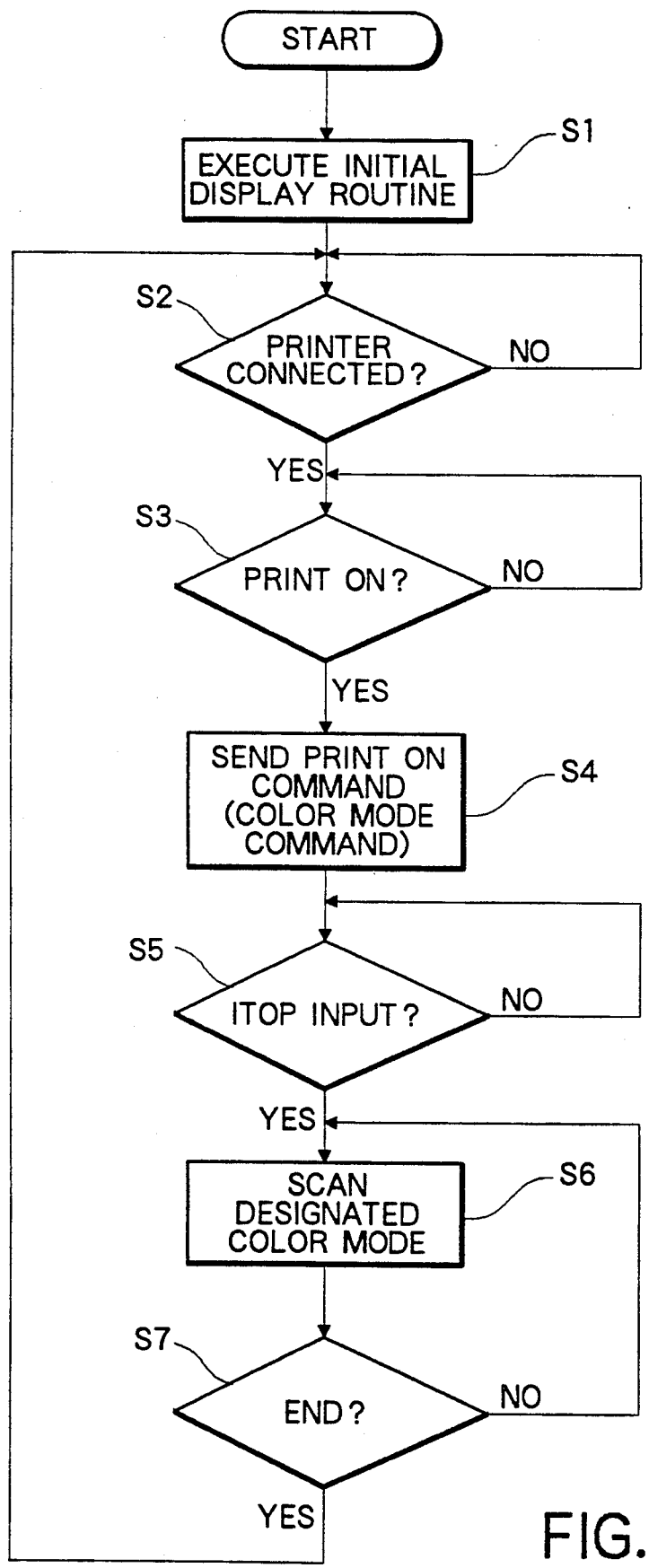
FIG. 12 is a flowchart illustrating the operation of the controller of a reader.

FIG. 12 is a flowchart illustrating the operation of the controller 10 of the reading section. This control program is stored in the ROM 10-2. In FIG. 12, a initial display routine is executed at step S1 when power is introduced to the reading section 100. This routine involves processing for, e.g., checking each I/O unit, checking the displays of indicators, initializing the RAM 10-3 and moving the scanning unit to a scanning starting point. Step S2 calls for the system to wait for a state in which a connection is made to the printer controller 2500 via the communication line 24. The connected state is not attained if the communication line 24 is not connected or power is not being supplied to the printing section 2000. If the connected state is verified at step S2, the program proceeds to step S3, at which the system waits for the print (copy) switch of the operating unit 16 to be pressed. When the print switch is pressed, the program proceeds to step S4, at which a print ON command is outputted to the printing section 2000 along with printing mode information. This printing mode information includes whether or not this is the color-separated print image output mode and is outputted in accordance with the instruction given to the operating unit 16. The system waits for the arrival of the ITOP signal from the printing section 2000 at step S5. When the ITOP signal enters at step S5, the program proceeds to step S6, at which the original image is scanned and the video data delivered to the printing section 2000. At this time the selection of the printing mode or the like is applied to the controller 10 from the operating unit 16. The controller 10 transmits this information to the various elements of the controller and to the controller 2500 of the printing section 2000.

Figure 13:
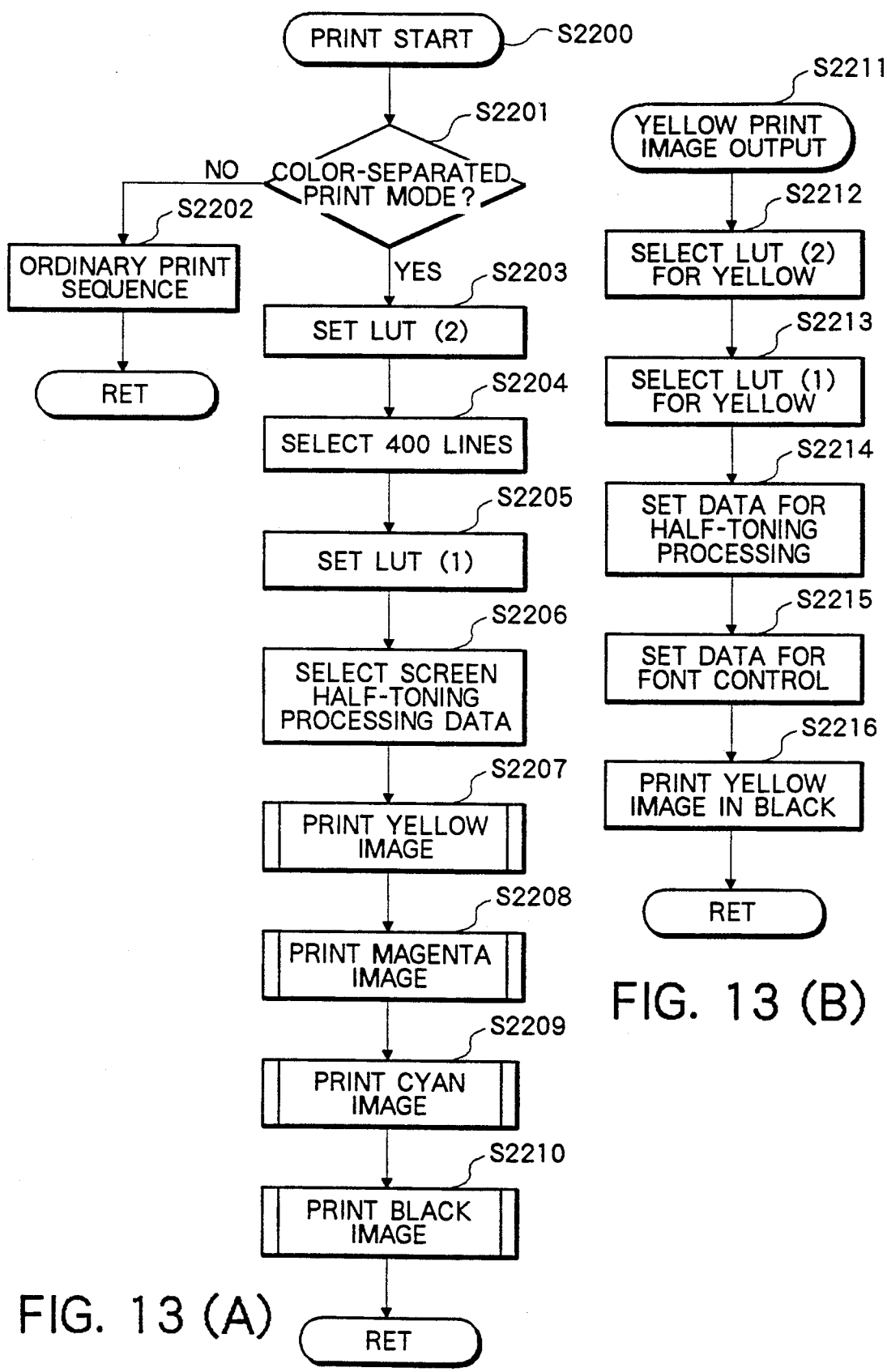
FIG. 13(A) is a flowchart illustrating the operation of the controller of a printer.
FIG. 13(B) is a flowchart illustrating the details of a procedure for outputting a color-separated Y-color print image according to the embodiment.

FIG. 13(A) is a flowchart illustrating the operation of the controller 2500 of the printing section. When a print ON command is received from the reading section 100, the program proceeds to step S2200. The output mode of the color-separated print image (the original image for a printing press) is checked at step S2201. If the effective mode is not that for outputting the color-separated print image, the program proceeds to step S2202, at which the image of a color copy or the like is outputted by an ordinary printing sequence. If the color-separated print image output mode is in effect, the 400 line-output look-up tables which prevail at the time of the above-described screen half-toning processing are set in the RAM [LUT(2)] 2106, which is for correcting the printer output characteristic, with regard to each of the colors Y, M, C, BK at step S2203. The 400-line (A-side) input of the selector 2119 of FIG. 2 is selected at step S2204. The look-up tables are set in the RAM [LUT (1)] 2101, which is for screen half-toning processing, with regard to each of the colors Y, M, C, BK at step S2205. The A-side input of the selector 2103 of FIG. 2 is selected at step S2206. This is followed by step S2207, at which the image of the color-separated Y screen image is outputted to a first transfer material in accordance with a processing procedure, described below, then by a step S2208, at which the image of the color-separated M screen image is similarly outputted to a second transfer material, then by a step S2209, at which the image of the color-separated C screen image is similarly outputted to a third transfer material, and then by a step S2210, at which the image of the color-separated BK screen image is similarly outputted to a fourth transfer material.

FIG. 13(B) is a flowchart illustrating the details of a procedure for outputting the color-separated Y print image. In this flowchart, the Y-correction table of LUT (2) is selected at step S2212, and the Y screen half-toning processing table of LUT (1) is selected at step S2213. The initializing data for Y is set with respect to the screen half-toning processing circuit 2012 in such a manner that a Y-screen angle is applied to the output image. The necessary data is set in the font control circuit 2109 at step S2115. The necessary data referred to here is, e.g., the registration mark "#" attached for the purpose of registration, the color information mark "Y" indicating the color-separated Y print image, and these output addresses. The image data of the color-separated Y print image is developed by the black (BK) developer 2295 at step S2216 to output the image of the color-separated Y print image. Also, with regard to the other color-separated print images M, C, BK, the respective screen angles are applied, and the image data are developed by the BK developer 2295 along with the registration mark "#" and color information marks "M", "C" and "BK". The images of the respective color-separated print images are outputted.

In FIG. 10, the image of each color-separated print image is printed in black (BK). However, these can readily be distinguished by the simultaneously printed character marks "Y, M, C, BK". Accurate positioning can be achieved by registering the registration marks "#".

Though a laser beam-type printer is used in the present embodiment, the invention is not limited to this arrangement. It is possible to employ other types of printers, such as an ion flow-type printer, LED printer or LCD printer.

Though the screen angle is made different for every color in the present embodiment, the invention is not limited to this arrangement. Since there are cases where almost no black is used, depending upon the image of the particular original, it is permissible if the same angle is employed for two or more colors.

Though the sequence in which a transfer is made to the transfer materials is "Y→M→C→BK" in the present embodiment, the invention is not limited to this sequence. For example, the sequence "Y→C→M→BK" may be employed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which comprises:
input means for inputting image data;
density converting means for converting pixel density of the image data in each predetermined block consisting of a plurality of pixels in accordance with predetermined screen half-toning information; and pulse-width modulation means for tone-processing the image data density-converted by said density converting means and outputting a pulse-width-modulated signal.

2. The apparatus according to claim 1, wherein said density converting means subjects an output density $V_{ij}'$ of each pixel of interest to a density conversion in accordance with screen half-toning information based on the following equation as the predetermined screen half-toning information:

$$V_{ij}' = nV_{ij} - r(P_{ij} - 1)$$

$$0 = V_{ij}' \leq r$$

where
$V_{ij}$ is input density of each pixel of interest,
n is the number of pixels in said predetermined block,
r is maximum density, and
$P_{ij}$ is a weighting coefficient.

3. The apparatus according to claim 2, wherein said weighting coefficient comprises information which reduces the number of coefficients toward the approximate center pixel position of said predetermined block.

4. An image forming apparatus which comprises:
operating means for designating an image output mode;
density converting means for subjecting color-separated image data of each of several predetermined colors to a density conversion in accordance with predetermined screen half-toning information;
pulse-width modulated signal output means for tone-processing the color-separated image data of each color or the image data density-converted by said density converting means, and outputting a pulse-width modulated signal; and
image forming means for selectively setting, in dependence upon a designation from said operating means, a first mode in which one reproduced image is formed on a recording medium by the pulse-width modulated signal based on the color-separated image data of each color, and a second mode in which a plurality of reproduced images corresponding to respective colors are formed on separate respective sheets of recording media, the number whereof corresponds to the number of color separations, by the pulse-width modulated signal based on the image data density-converted by said density converting means.

5. The apparatus according to claim 4, wherein said pulse-width modulated signal output means converts said color-separated image data into a pulse-width modulated signal by a pattern signal having a first period in the first mode, and converts said color-separated image data into a pulse-width modulated signal by a pattern signal having a second period longer than the first period in the second mode.

6. An image forming apparatus which comprises:
pulse-width modulated signal output means for tone-processing color-separated image data of each of plural colors and outputting pulse-width modulated signals corresponding to respective ones of the colors; and
image forming means for forming images on respective sheets of recording media, automatically in accordance with the pulse-width modulated signals which correspond to respective ones of the colors and which are outputted by said pulse-width modulated signal output means, wherein the number of the sheets corresponds to the number of color separations.

7. The apparatus according to claim 6, further comprising density converting means for subjecting said color-separated image data of each color to a density conversion, by subjecting an output density $V_{ij}'$ of each pixel of interest to a density conversion in accordance with screen half-toning information based on the following equation:

$$V_{ij}' = nV_{ij} - r(P_{ij} - 1)$$

$$0 \leq V_{ij}' \leq r$$

where
$V_{ij}$ is input density of each pixel of interest,
n is the number of pixels in a predetermined area,
r is maximum density, and
$P_{ij}$ is a weighting coefficient.

8. An image forming apparatus which comprises:
density converting means for subjecting color-separated image data of each of plural colors to a density conversion in accordance with predetermined screen half-toning information;
binary coding means for converting the image data, which has been density-converted by said density converting means, into a binary-coded signal conforming to the density; and
image forming means for forming images automatically on respective sheets of recording media, wherein the number of the sheets corresponds to the number of color separations in accordance with the binary-coded signal outputted by said binary coding means.

9. The apparatus according to claim 8, wherein said density converting means subjects an output density $V_{ij}'$ of each pixel of interest to a density conversion in accordance with screen half-toning information based on the following equation as the predetermined screen half-toning information:

$$V_{ij}' = nV_{ij} - r(P_{ij} - 1)$$

$$0 \leq V_{ij}' \leq r$$

where
$V_{ij}$ is input density of each pixel of interest,
n is the number of pixels in a predetermined area,
r is maximum density, and
$P_{ij}$ is a weighting coefficient.

10. The apparatus according to claim 8, wherein said image forming means forms an image of a screen angle which differs for every item of image data of each color.

11. The apparatus according to claim 10, wherein said screen angle is within a range of 20°–70°, inclusive, for magenta or cyan, 0°–20°, inclusive, for yellow and 70°–90°, inclusive, for black.

12. An image forming apparatus which comprises:
density converting means for subjecting image data to a density conversion in accordance with predetermined screen half-toning information;

tone converting means for performing a density tone conversion on the image data density-converted by said density converting means;

binary coding means for converting the image data, which has been tone-converted by said tone converting means, into a binary-coded signal conforming to the density thereof; and image forming means for forming an output image in accordance with the binary-coded signal.

13. An image copying apparatus which comprises:

reading means for scanning an original image and generating image data;

processing means for processing the image data and outputting color-separated image data of each of plural colors;

operating means for designating an image output mode;

image forming means for selectively setting, in dependence upon the designation by said operating means, a first mode in which a reproduced image is formed on a recording medium in accordance with the color-separated image data of each color, and a second mode in which a plurality of reproduced images, corresponding respectively to color-separated image data of respective colors, are automatically formed on respective sheets of recording media respectively, wherein the number of sheets corresponds to the number of the color separations.

14. The apparatus according to claim 13, wherein said processing means includes pulse-width modulated signal output means for tone-processing color-separated image data of each color and outputting pulse-width modulated signals corresponding to respective ones of the colors.

15. An image processing method comprising the steps of:

inputting image data;

converting pixel density of the image data in each predetermined block consisting of a plurality of pixels in accordance with predetermined screen half-toning information;

tone-processing the density-converted image data; and outputting a pulse-width-modulated signal representing the tone-processed image data.

16. A method according to claim 15, wherein the screen half-toning information is based on the following equation:

$$V_{ij}' = nV_{ij} - r(P_{ij} - 1)$$

$$0 \leq V_{ij}' \leq r$$

where $V_{ij}$ is input density of each pixel of interest,
n is the number of pixels in the predetermined block,
r is maximum density, and
$P_{ij}$ is a weighting coefficient.

17. A method according to claim 16, wherein the weighting coefficient comprises information which reduces the number of coefficients toward the approximate center pixel position of the predetermined block.

18. An image processing method comprising the steps of:

converting a density of color-separated image data of each of plural colors in accordance with predetermined screen half-tone information;

binary-coding the density-converted image data; and outputting the binary-coded image data in order to form images automatically on respective sheets of recording media, wherein the number of the sheets corresponds to the number of color separations in accordance with the binary-coded image data.

19. A method according to claim 18, wherein the screen half-toning information is based on the following equation:

$$V_{ij}' = nV_{ij} - r(P_{ij} - 1)$$

$$0 \leq V_{ij}' \leq r$$

where $V_{ij}$ is input density of each pixel of interest,
n is the number of pixels in a predetermined block,
r is maximum density, and
$P_{ij}$ is a weighting coefficient.

20. A method according to claim 19, wherein the weighting coefficient comprises information which reduces the number of coefficients toward the approximate center pixel position of the predetermined block.

21. A method according to claim 18, further comprising the step of forming an image of a screen angle which differs for every item of image data of each color.

22. A method according to claim 21, wherein the colors include black, yellow and either magenta or cyan, and wherein the screen angle is within a range of 20°–70°, inclusive, for magenta or cyan, 0°–20°, inclusive, for yellow and 70°–90°, inclusive, for black.

23. An image processing method comprising the steps of:

subjecting image data to a density conversion in accordance with predetermined screen half-toning information;

performing a density tone conversion on the density-converted image data;

converting the tone-converted image data into a binary-coded image data conforming to the density; and outputting the binary-coded image data in order to form an output image.

24. A method according to claim 23, wherein the screen half-toning information is based on the following equation:

$$V_{ij}' = nV_{ij} - r(P_{ij} - 1)$$

$$0 \leq V_{ij}' \leq r$$

where $V_{ij}$ is input density of each pixel of interest,
n is the number of pixels in a predetermined block,
r is maximum density, and
$P_{ij}$ is a weighting coefficient.

25. A method according to claim 24, wherein the weighting coefficient comprises information which reduces the number of coefficients toward the approximate center pixel position of the predetermined block.

26. A method according to claim 23, wherein said converting step further includes the steps of tone-processing the tone-converted image data and outputting pulse-width-modulated signals.

27. A method according to claim 23, wherein the image data is color-separated image data of each of plural colors, and each of the color-separated image data is density-converted, tone-converted and binary-coded.

28. An image processing method comprising the steps of:
   tone-processing color-separated image data of each of plural colors; and
   forming images on respective sheets of recording media, sequentially and automatically in accordance with the tone-processed color-separated image data, wherein the number of the sheets corresponds to the number of color separations.

* * * * *

UNITED STATES PATENT AND TRADEMARK OFFICE
CERTIFICATE OF CORRECTION

PATENT NO. : 5,081,528
DATED : January 14, 1992
INVENTOR(S) : KIMIYOSHI HAYASHI, ET AL.

It is certified that error appears in the above-identified patent and that said Letters Patent is hereby corrected as shown below:

COLUMN 1

Line 25, "image" should read --image for--.
Line 27, "such" should be deleted.
Line 41, "shading" should read --in shading--.
Line 47, "abovementioned" should read --above-mentioned--.
Line 54, "are" (first occurrence) should read --is--.
Line 55, "abovementioned" should read --above-mentioned--.
Line 67, "below," should read --below;--.

COLUMN 5

Line 26, "o" should read --on--.

COLUMN 6

Line 11, "trophotograpy," should read --trophotography,--.
Line 50, "0<$\gamma$2M" should read --0<$\gamma$<2M--.

COLUMN 7

Line 57, "int he" should read --in the--.

COLUMN 8

Line 44, "CPU 2210," should read --CPU 2110,--.

COLUMN 9

Line 37, "screeen" should read --screen--.

UNITED STATES PATENT AND TRADEMARK OFFICE
CERTIFICATE OF CORRECTION

PATENT NO. : 5,081,528
DATED : January 14, 1992
INVENTOR(S) : KIMIYOSHI HAYASHI, ET AL.

It is certified that error appears in the above-identified patent and that said Letters Patent is hereby corrected as shown below:

COLUMN 11

Line 47, "latter" should read --later--.

COLUMN 12

Line 51, "incidates" should read --indicates--.

COLUMN 14

Line 5, "abovementioned" should read --above-mentioned--.
Line 6, "realtime," should read --real time,--.

COLUMN 16

Line 44, "laserbeam" should read --laser beam--.
Line 45, "printr" should read --printer--.

COLUMN 17

Line 26, "subsidary" should read --subsidiary--.
Line 41, "simply" should read --simplify--.
Line 66, "abovementioned" should read --above-mentioned--.

COLUMN 18

Line 45, "comparator 2146" should read --comparator 2147--.

COLUMN 21

Line 17, "$0=V_{ij}'\leq r$" should read --$0 \leq V_{ij}' \leq r$--.

UNITED STATES PATENT AND TRADEMARK OFFICE
CERTIFICATE OF CORRECTION

PATENT NO. : 5,081,528
DATED : January 14, 1992
INVENTOR(S) : KIMIYOSHI HAYASHI, ET AL.

It is certified that error appears in the above-identified patent and that said Letters Patent is hereby corrected as shown below:

COLUMN 23

Line 17, "mode;" should read --mode; and--.

Signed and Sealed this

Eighth Day of June, 1993

Attest:

MICHAEL K. KIRK

Attesting Officer

Acting Commissioner of Patents and Trademarks